(12) United States Patent
Zushi et al.

(10) Patent No.: US 10,484,816 B2
(45) Date of Patent: Nov. 19, 2019

(54) INFORMATION TERMINAL, INFORMATION PROCESSING APPARATUS, INFORMATION PROCESSING SYSTEM, AND INFORMATION PROCESSING METHOD

(71) Applicants: Toru Zushi, Kanagawa (JP); Tadahiro Takata, Kanagawa (JP); Kouichi Yamada, Kanagawa (JP); Shinji Kaizuka, Kanagawa (JP); Hiroyoshi Kuroda, Kanagawa (JP); Teruko Hashizume, Kurume-shi (JP)

(72) Inventors: Toru Zushi, Kanagawa (JP); Fumihiko Hashizume, Kanagawa (JP); Tadahiro Takata, Kanagawa (JP); Kouichi Yamada, Kanagawa (JP); Shinji Kaizuka, Kanagawa (JP); Hiroyoshi Kuroda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/989,243

(22) Filed: May 25, 2018

(65) Prior Publication Data

US 2018/0343540 A1  Nov. 29, 2018

(30) Foreign Application Priority Data

May 26, 2017 (JP) ................................ 2017-104826

(51) Int. Cl.
*H04W 24/00* (2009.01)
*H04W 4/021* (2018.01)
(Continued)

(52) U.S. Cl.
CPC ............ *H04W 4/021* (2013.01); *H04B 11/00* (2013.01); *H04W 4/20* (2013.01); *H04W 4/80* (2018.02);
(Continued)

(58) Field of Classification Search
CPC ......... H04W 4/021; H04W 4/20; H04W 4/80; H04W 48/10; H04W 64/003; H04B 11/00
(Continued)

(56) References Cited

U.S. PATENT DOCUMENTS

| 2015/0222370 A1* | 8/2015 | Shinotsuka ............ H04B 11/00 367/137 |
| 2016/0204880 A1* | 7/2016 | Endo ...................... H04B 11/00 367/137 |

FOREIGN PATENT DOCUMENTS

| JP | 2014-059203 | 4/2014 |
| JP | 2015-053721 | 3/2015 |

* cited by examiner

*Primary Examiner* — Marcos Batista
(74) *Attorney, Agent, or Firm* — Oblon, McClelland, Maier & Neustadt, L.L.P.

(57) ABSTRACT

An information terminal including circuitry configured to acquire, using a plurality of function modules, identification data unique to each positioning devices, from sound waves output, respectively, from the plurality of positioning devices; acquire site information of a corresponding site being one of a plurality of sites in each of which at least one positioning device is placed, from an information processing apparatus that manages, for each site, the site information that includes specifying information for specifying one of the plurality of function modules capable of executing predetermined processing on the corresponding site corresponding to a position of the information terminal; and cause the function module specified by the specifying information to execute the predetermined processing. The plurality of function modules is configured to acquire the identification data in different schemes from each other and execute the predetermined processing.

18 Claims, 21 Drawing Sheets

(51) Int. Cl.
*H04B 11/00* (2006.01)
*H04W 48/10* (2009.01)
*H04W 4/80* (2018.01)
*H04W 64/00* (2009.01)
*H04W 4/20* (2018.01)
*H04W 4/33* (2018.01)

(52) U.S. Cl.
CPC ......... *H04W 48/10* (2013.01); *H04W 64/003* (2013.01); *H04W 4/33* (2018.02)

(58) Field of Classification Search
USPC .............................. 455/456.1–456.3; 370/338
See application file for complete search history.

FIG. 10A

| | FIG. 10AA |
|---|---|
| | FIG. 10AB |

FIG. 10AA

| SITE | DEVICE ID | FLOOR ID | AREA ID | INSTALLATION POSITION (LATITUDE, LONGITUDE AND ALTITUDE) |
|---|---|---|---|---|
| SITE A | DEV1001 | FLR10001 | AREA001 | 35.aaaa0010, 135.bbbb0021, 1.20 |
|  | DEV1002 | FLR10001 | AREA001 | 35.aaaa0010, 135.bbbb0031, 1.20 |
|  | ... | ... | ... | ... |
| SITE B | DEV5001 | FLR50001 | AREA005 | 35.xxxx0120, 135.yyyy0011, 0.5 |
|  | DEV5002 | FLR50001 | AREA006 | 35.xxxx0121, 135.yyyy0033, 0.5 |
|  | ... | ... | ... | ... |
| ... | | | | |

| POSITION ID | ACCESS INFORMATION | ENCRYPTION KEY |
|---|---|---|
| SP1001 | URL1 | xxxx |
| SP1002 | URL1 | xxxx |
| ... | ... | ... |
| SP5001 | URL2 | zzzz |
| SP5002 | URL2 | zzzz |
| ... | ... | ... |

FIG. 10AB

| LIBRARY ID | LIBRARY TYPE | 821 |
|---|---|---|
| LIB00A | COMPANY A LIBRARY | ⋮ |
| | | ⋮ |
| LIB00B | COMPANY B LIBRARY | ⋮ |
| LIB00B | COMPANY B LIBRARY | ⋮ |
| ⋮ | ⋮ | ⋮ |
| ⋮ | ⋮ | ⋮ |

FIG. 10B

| APP ID | POSITION-ING TIME | COORDINATE INFORMATION (LATITUDE, LONGITUDE AND ALTITUDE) | FLOOR ID | AREA ID | DIRECTION | TRAVEL SPEED (m/s) | 823 |
|---|---|---|---|---|---|---|---|
| AP0001 | 20xx.1.1 10:10:01 | 35.aaaa0010, 135.bbbb0021, 1.20 | FLR10001 | AREA001 | 0 | 0.8 | ... |
| AP0001 | 20xx.1.1 10:10:02 | 35.aaaa0010, 135.bbbb0025, 1.20 | FLR10001 | AREA001 | 0 | 0.5 | ... |
| AP0001 | 20xx.1.1 10:10:03 | 35.aaaa0010, 135.bbbb0030, 1.20 | FLR10001 | AREA002 | 0 | 0.65 | ... |
| ... | ... | ... | ... | ... | ... | ... | ... |

FIG. 11A

| FACILITIES | FLOOR ID | FLOOR NAME | STORY | ALTITUDE (m) | ... |
|---|---|---|---|---|---|
| FACILITY A | FLR10001 | FLOOR A | 1 | 1 | ... |
| | FLR10002 | FLOOR B | 2 | 5 | ... |
| | FLR10003 | FLOOR C | 3 | 9 | ... |
| | ... | ... | ... | ... | ... |
| | FLR20001 | ○○ | B1 | −5 | ... |
| | FLR20002 | ×× | 1 | 0 | ... |
| ... | ... | ... | ... | ... | ... |

FIG. 11B

| FLOOR ID | AREA ID | AREA CATEGORY | MAP ID | AREA WIDTH × DEPTH | ... |
|---|---|---|---|---|---|
| FLR10001 | AREA001 | SHOP A | MAP0001 | W1 × D1 | ... |
| | AREA002 | SHOP A | MAP0001 | W2 × D2 | ... |
| | AREA003 | SHOP B | MAP0001 | W3 × D3 | ... |
| | AREA004 | SHOP B | MAP0001 | W4 × D4 | ... |
| | AREA005 | PASSAGE | MAP0001 | W5 × D5 | ... |
| | ... | ... | ... | ... | ... |
| ... | | | | | |

FIG. 11C

| MAP ID | IMAGE FILE URL | REFERENCE POINT (LATITUDE AND LONGITUDE) | RELATIVE POSITION (X-DIRECTION, Y-DIRECTION) | SCALE | ROTATION ANGLE | 1103 |
|---|---|---|---|---|---|---|
| MAP0001 | URL0001 | aaa, bbb | x1, y1 | 1/50 | 0° | ... |
| MAP0002 | URL0002 | ccc, ddd | x2, y2 | 1/100 | 180° | ... |
| ... | | ... | ... | | | ... |

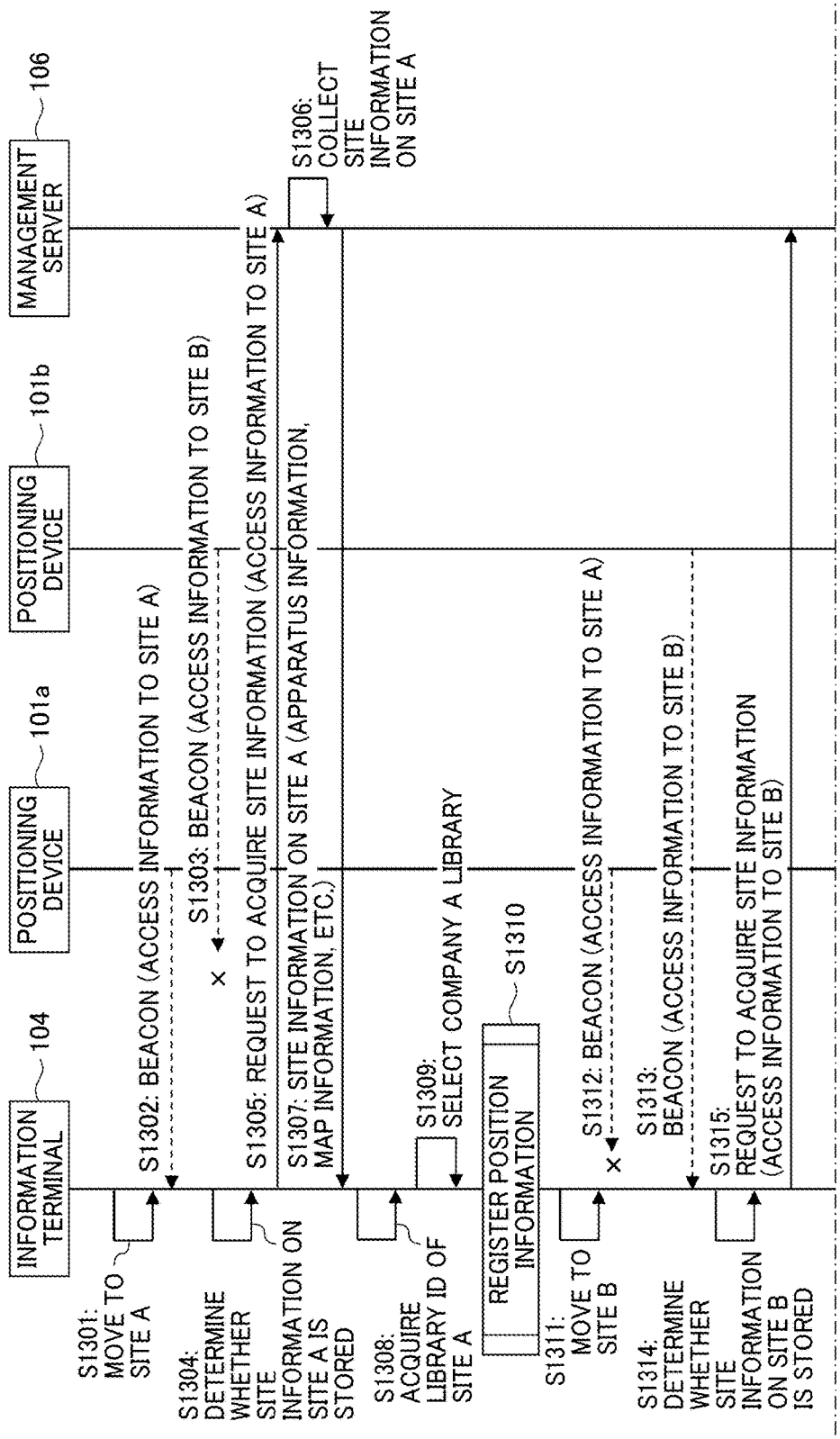

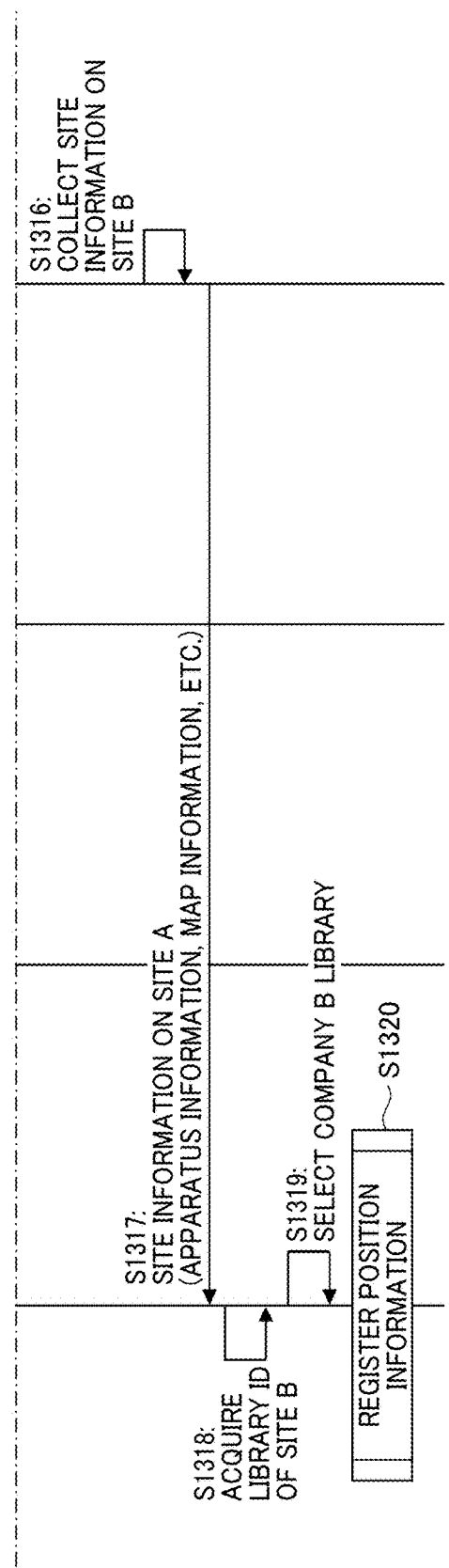

FIG. 16

| FLOOR ID | SECTION ID | SECTION TYPE | LIBRARY ID | LIBRARY TYPE | POSITION OF SECTION |
|---|---|---|---|---|---|
| FLR10001 | K0001 | GEOFENCE A | LIB00B | COMPANY B LIBRARY | (x1, y1), (x2, y2), (x3, y3), (x4, y4) |
| ⋮ | ⋮ | ⋮ | ⋮ | ⋮ | ⋮ |
| | ⋮ | ⋮ | ⋮ | ⋮ | ⋮ |

1601

INFORMATION TERMINAL, INFORMATION PROCESSING APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2017-104826, filed on May 26, 2017, in the Japan Patent Office, the entire disclosure of which is hereby incorporated by reference herein.

BACKGROUND

Technical Field

This disclosure relates to an information terminal, an information processing apparatus, an information processing system, and an information processing method.

Description of the Related Art

There are position information management systems to manage position information of a terminal based on identification information or the like included in sound waves output from positioning devices.

SUMMARY

According to an embodiment of this disclosure, an information terminal includes circuitry configured to acquire, using a plurality of function modules, identification data unique to each positioning devices, from sound waves output, respectively, from the plurality of positioning devices. The circuitry is further configured to acquire site information of a corresponding site being one of a plurality of sites in each of which at least one positioning device is placed, from an information processing apparatus. The information processing device manages, for each site, the site information that includes specifying information for specifying one of the plurality of function modules capable of executing predetermined processing on the corresponding site corresponding to a position of the infoiniation terminal. The circuitry is further configured to cause the function module specified by the specifying information to execute the predetermined processing. The plurality of function modules is configured to acquire the identification data in different schemes from each other.

According to another embodiment, an information processing system includes the above-described information terminal, the plurality of positioning devices each including circuitry configured to transmit a radio wave including access information for acquiring the site information, and the information processing apparatus connected with the information terminal via a network. The information processing apparatus includes circuitry configured to manage, for each site, site information that includes specifying information for specifying one of the plurality of function modules capable of executing the predetermined processing on the site; receive, from the information terminal, an acquisition request for the site information; and transmit the site information to the information terminal in response to the acquisition request.

Another embodiment provides an information processing apparatus connected, via a network, with an information terminal that acquires, using a plurality of function modules, identification data unique to each of a plurality of positioning devices, from sound waves that are output, respectively, from the plurality of positioning devices. The plurality of function modules is configured to acquire the identification data in different schemes from each other and execute predetermined processing. The information processing apparatus includes circuitry configured to manage, for each site on which at least one positioning device is placed, site information that includes specifying information for specifying one of the plurality of function modules capable of executing the predetermined processing on the site; receive, from the information terminal, an acquisition request for the site information; and transmit the site information to the information terminal in response to the acquisition request.

Another embodiment provides a method for operating an information terminal. The method includes acquiring, using a plurality of function modules, identification data unique to each of a plurality of positioning devices, from sound waves that are output, respectively, from the plurality of positioning devices. The plurality of function modules is configured to acquire the identification data in different schemes from each other and execute predetermined processing. The method further includes acquiring site information of a corresponding site being one of a plurality of sites in each of which at least one positioning device is placed, from an information processing apparatus. The information processing apparatus manages, for each site, the site information that includes specifying information for specifying one of the plurality of function modules capable of executing the predetermined processing on the corresponding site corresponding to a position of the information terminal. The method further includes causing the function module specified by the specifying information to execute the predetermined processing.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 10AA, 10AB, and 10B illustrate an example of information managed by a management server of the information processing system illustrated in FIG. 8;

FIGS. 11A, 11B, and 11C illustrate another example of information managed by the management server of the information processing system illustrated in FIG. 8;

FIGS. 13A and 13B are sequence charts illustrating an example of selection of processing executing unit, according to Embodiment 1;

FIG. 16 illustrates an example of geofence information according to Embodiment 2.

Figure 1:
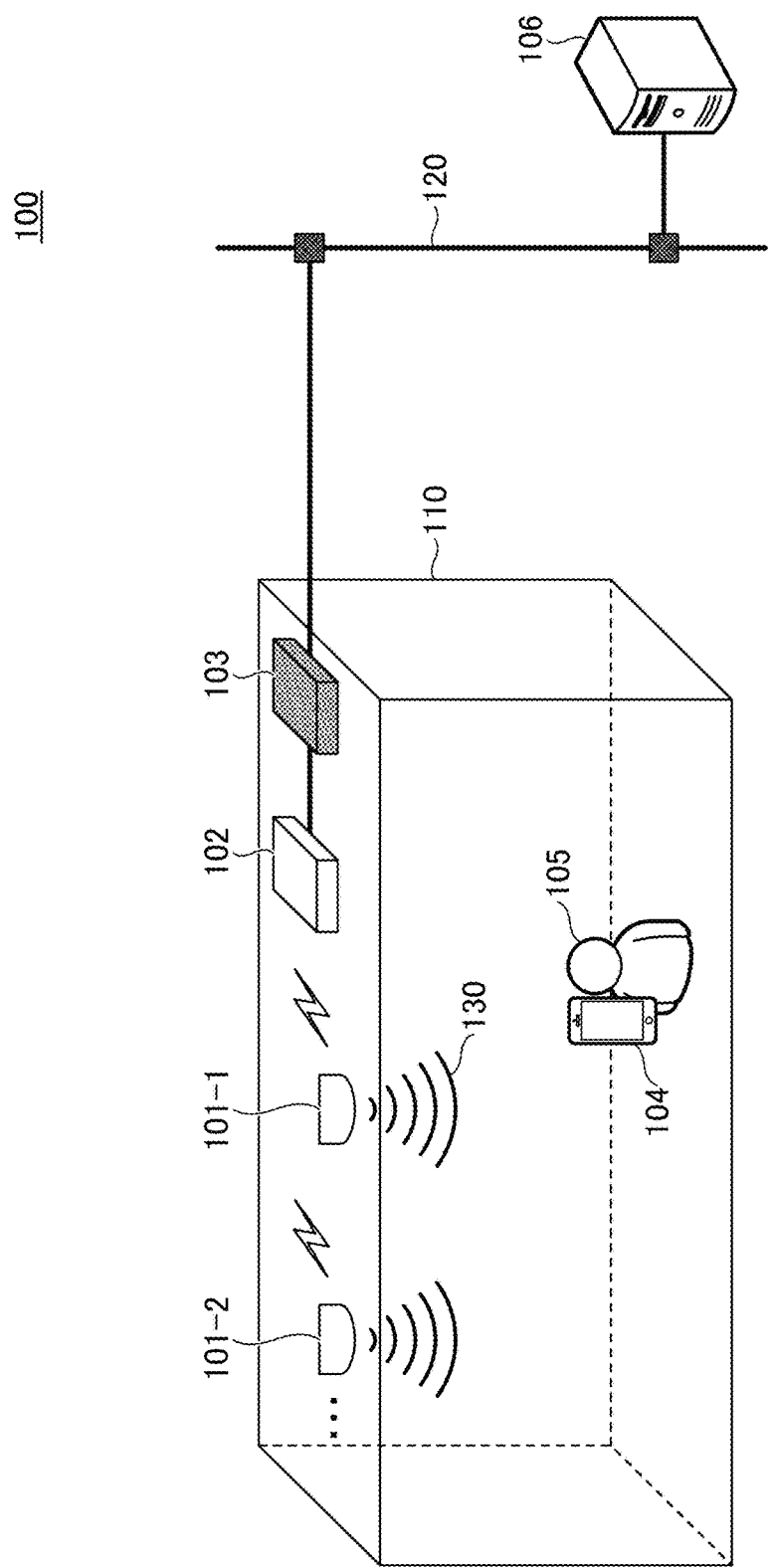
FIG. 1 is illustration of an information processing system according to an embodiment of this disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an information processing system according to an embodiment of this disclosure is described. As used herein, the singular forms "a", "an", and "the" are intended to include the plural forms as well, unless the context clearly indicates otherwise.

System Configuration

A description is given of a configuration of an information processing system according to an embodiment.

FIG. 1 is illustration of an information processing system 100 according to the present embodiment. The information processing system 100 includes a management server 106 connected to a network 120, to manage position information indicating a location of an information terminal 104 carried by a user 105.

In FIG. 1, a floor 110 (a story) of a building or facilities is equipped with a plurality of positioning devices 101-1, 101-2, and so on, a wireless gateway 102, and an external gateway 103. The external gateway 103 is connected to the management server 106 via the network 120 such as the Internet or a local area network (LAN). Hereinafter, any one of the plurality of positioning devices 101-1, 101-2, and so on is referred to as "positioning device 101". The number of positioning devices 101 illustrated in FIG. 1 is one example, and the number thereof can be any number equal to or greater than one.

The positioning device 101 outputs, to a predetermined range, a sound wave including identification data unique to an individual positioning device 101 (hereinafter "position identification" or "position ID"). The positioning device 101 is connected, by a predetermined wireless communication, to a wireless network provided by the wireless gateway 102.

Preferably, the positioning device 101 transmits a radio wave including access information, through short-range wireless communication such as Bluetooth® Low Energy (BLE). The access information is used to acquire information on the site where the positioning device 101 is placed.

The wireless gateway 102 is connected to the external gateway 103 and serves as a relay device to create a wireless communication network together with the plurality of positioning devices 101, by predetermined wireless communication.

The external gateway 103 is a relay device connected to the network 120 via, for example, a wireless wide area network (WAN) such as third generation (3G) of mobile telecommunications and long term evolution (LTE); or a local area network (LAN). The external gateway 103 is connected to at least one wireless gateway 102 via, for example, a LAN.

The wireless gateway 102 and the external gateway 103 relay communication between the plurality of positioning devices 101 and the management server 106. For example, the management server 106 can transmit data to the plurality of positioning devices 101 via the wireless gateway 102 and the external gateway 103. The positioning devices 101 can transmit data to the management server 106 via the wireless gateway 102 and the external gateway 103.

The information terminal 104 is a terminal device, such as a smartphone, a cellar phone, and a tablet terminal, carried by the user 105. The information terminal 104 is connected to the network 120 via a wireless WAN, a wireless LAN, or the like and can communicate with the management server 106.

The information terminal 104 executes an application program (hereinafter "App") dedicated to the information terminal corresponding to the information processing system 100. The information terminal 104 executes an information terminal App to receive a radio wave (hereinafter "beacon") transmitted, by short-range wireless communication, from the positioning device 101 and acquires access information used to obtain site information included in the radio wave. The site information is information about the site where the positioning device 101 is placed.

Preferably, the access information, which is acquired by the information terminal 104 from the positioning device 101, includes, in an encrypted form, information, such as a uniform resource locator (URL), for acquiring the information on the site where the positioning device 101 is placed.

Further, the information terminal 104 determines whether the site information on the site where the positioning device 101 is placed, available with the acquired access information, has been acquired. That is, the information terminal 104 determines whether the site information on the site (e.g., the floor 110) corresponding to the position of the information terminal 104 has been acquired. When the site information is not yet acquired, the information terminal 104 uses the acquired access information to acquire, from the management server 106 or the like, the site information on the site corresponding to the position of the information terminal 104.

The management server 106 (an information processing apparatus) can be either an information processing apparatus including a server function or a system including a plurality of information processing apparatuses.

The management server 106 manages, for each site where at least one positioning device 101 is placed, apparatus information in which the position ID of each positioning device 101 of that site is associated with the information on the position (e.g., coordinate data) where the positioning device 101 is installed. Further, in response to the acquisition request for the site information including the access information from the information terminal 104, the management server 106 transmits the site information including the apparatus information associated with the access information, to the information terminal 104 requesting the information.

Preferably, the site information includes the apparatus information regarding the site corresponding to the position of the information terminal 104 and detailed geographic information on the site corresponding to the position of the information terminal 104. With the site information, the information terminal 104 can use the identification data, the coordinate data, and the detailed geographic information of all positioning devices 101 installed at the site corresponding to the position of the information terminal 104.

Using the coordinate data and the geographic information on the positioning device 101 placed on the site corresponding to the position of the information terminal 104, the information terminal 104 can acquire the detailed position information in the site corresponding to the position of the information terminal 104.

Additionally, when the information terminal 104 moves to second site, the information terminal 104 acquires the site information on the site According to the signal output from the positioning device 101 located at the second site. In this manner, the information terminal 104 can acquire the detailed position information in the site corresponding to the position of the information terminal 104, in a plurality of sites.

The information terminal 104 transmits the acquired, detailed position information thereof and terminal identification data to identify itself (hereinafter "App ID") to the management server 106, at predetermined intervals. The management server 106 stores the position information of the information terminal 104 transmitted therefrom.

Sites

The term "site" used in this specification represents a region predetermined by a service provider or the like managing the management server 106. The predetermined region is, for example, an area including at least one facility, facilities, a floor in the facility, or an area on the floor. The description below is based on an example in which the site represents a floor in the facility.

Facility

Figure 2:
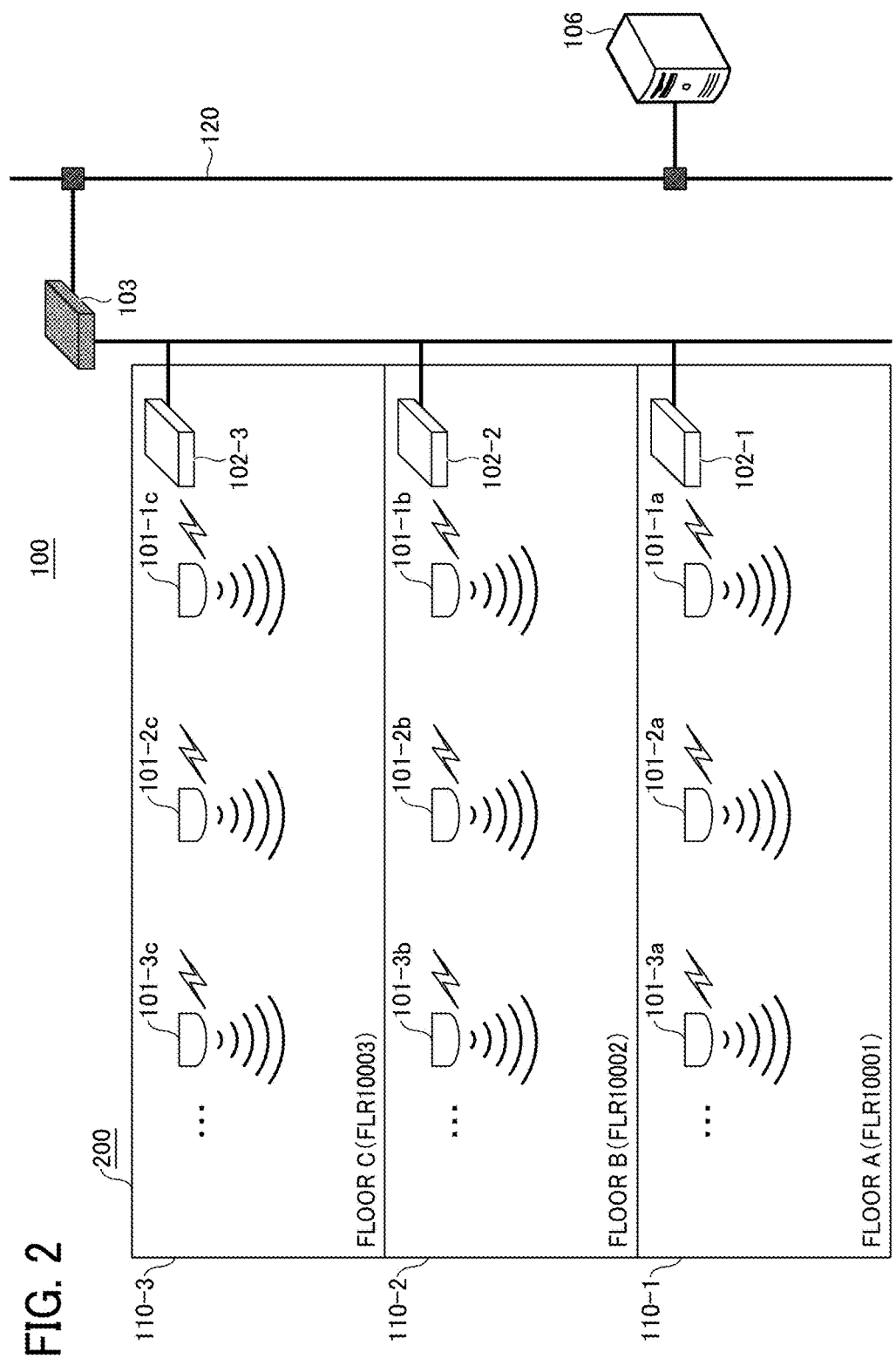
FIG. 2 is a diagram illustrating a facility according to an embodiment.

FIG. 2 is a diagram illustrating a facility according to the present embodiment. In the example illustrated in FIG. 2, the facility 200 is, for example, a building and includes three floors (three stories), namely, a floor A 110-1, a floor B 110-2, and a floor C 110-3. Thus, the facility 200 includes at least one floor.

Each floor is assigned with a floor ID, which is identification data to identify the floor. In the example illustrated in FIG. 2, the floor A 110-1 is assigned with a floor ID FLR10001, the floor B 110-2 is assigned with a floor ID FLR10002, and the floor C 110-3 is assigned with a floor ID FLR10003.

Each floor is provided with the wireless gateway 102 and at least one positioning device 101. For example, the floor A 110-1 is provided with the wireless gateway 102-1 and a plurality of positioning devices 101-1*a*, 101-2*a*, 101-3*a*, and so on. Similarly, the floor B 110-2 is provided with the wireless gateway 102-2 and positioning devices 101-1*b*, 101-2*b*, and 101-3*b*. The floor C 110-3 is provided with the wireless gateway 102-3 and positioning devices 101-1*c*, 101-2*c*, and 101-3*c*. The location of the positioning device 101 is managed in three-dimensional coordinate data including height direction. If the location is managed in two-dimensional coordinate data, the positioning devices 101 installed on different floors are not distinguished from each other.

Preferably, the coordinate data specifying the location of the positioning device 101 is managed in absolute coordinates such as latitude, longitude, and altitude. In this manner, the information on a plurality of facilities can be managed in one coordinate system.

For example, the coordinate data in the height direction is floor number. However, the coordinate data in the height direction here is altitude, for example, in meters. Use of altitude as the height direction coordinate is advantageous in that an identical type of height direction coordinate can be used for a facility having an irregular floor structure, such as a mezzanine, or a plurality of facilities in which the heights of the floors are different.

As illustrated in FIG. 2, the wireless gateways 102-1, 102-2, and 102-3, which are respectively installed on the floor A 110-1, the floor B 110-2, and the floor C 110-3, are connected via the external gateway 103 to the management server 106.

Floor

Figure 3:
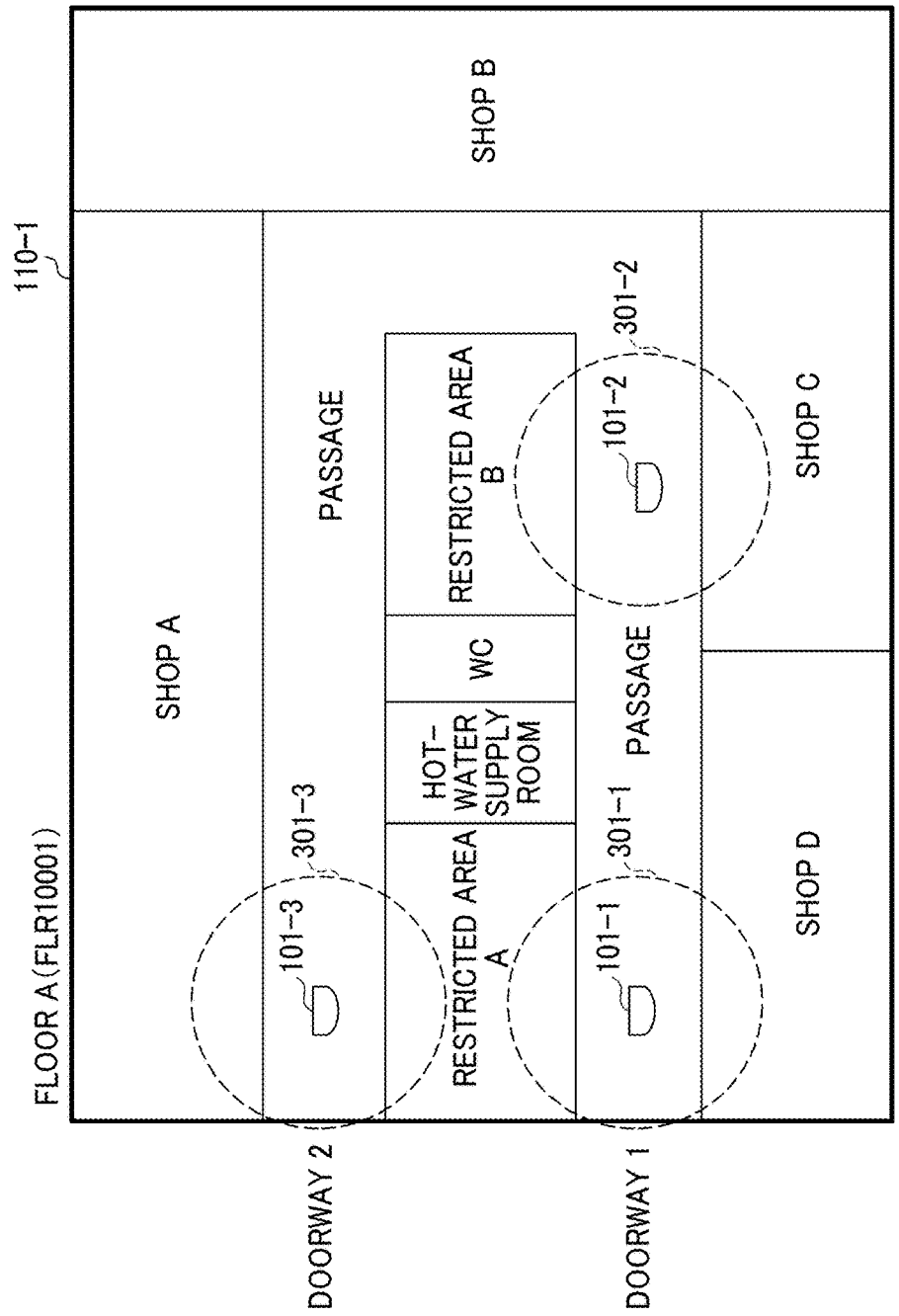
FIG. 3 is an example floor plan of the facility illustrated in FIG. 2.

FIG. 3 is a floor plan of the site According to the present embodiment. In the example illustrated in FIG. 3, on the floor A 110-1, there are a plurality of shops A, B, C, and D, a plurality of restricted areas A and B, and public areas such as a hot-water supply room and a water closet (WC).

In one example, three positioning devices 101-1, 101-2, and 101-3 are installed on the floor A 110-1 as illustrated in FIG. 3.

In FIG. 3, the positioning device 101-1 outputs a sound wave including the position ID of the positioning device 101-1 in an output range 301-1. The positioning device 101-2 outputs a sound wave including the position ID of the positioning device 101-2 in an output range 301-2. The positioning device 101-3 outputs a sound wave including the position ID of the positioning device 101-3 in an output range 301-3.

Preferably, the positioning devices 101-1, 101-2, and 101-3 transmit beacons for acquiring the site information of, for example, the floor A 110-1 (one example site) by short-range wireless communication such as BLE.

In FIG. 3, for example, the user 105 entering the floor A 110-1 through a doorway 1 carries the information terminal 104 that have not yet acquired the site information on the floor A 110-1. At that time, the information terminal 104 acquires the access information from the beacon and uses the access information to acquire the site information on the floor A 110-1 from the management server 106.

Then, using the position ID included in the sound wave output from the positioning device 101-1 and the site information on the floor A 110-1, the information terminal 104 can determine the coordinates representing the current position of the information terminal 104.

It is assumed that the information terminal 104 exits the output range 301-1 of sound wave output from the positioning device 101-1 and moves toward the positioning device 101-2. The information terminal 104 includes a sensor such as, an accelerometer or a geomagnetic sensor, to calculate the direction and distance of travel of the information terminal 104 and identifies the position thereof. Note that, there are methods to calculate the distance of travel of the information terminal 104 using a sensor, for example, various types of pedestrian dead reckoning (PDR). In the present embodiment, the mount of travel of the information terminal 104 is calculated using PDR.

Further, as the information terminal 104 enters the output range 301-2 for the positioning device 101-2 to output the sound wave, the information terminal 104 identifies the coordinates of the current position of the information terminal 104 based on the position ID included in the sound wave output from the positioning device 101-2 and the site information on the floor A 110-1. At that time, the information terminal 104 can initialize the data of travel amount calculated by the PDR.

Thus, in the present embodiment, the information terminal 104 can acquire the position information of its own as long as the positioning device 101 is installed, at least, in the doorway (e.g., doorways 1 and 2 in FIG. 3) or the like on each floor. It is not necessary to install the positioning device 101 to cover the entire floor.

Area

Figure 4:
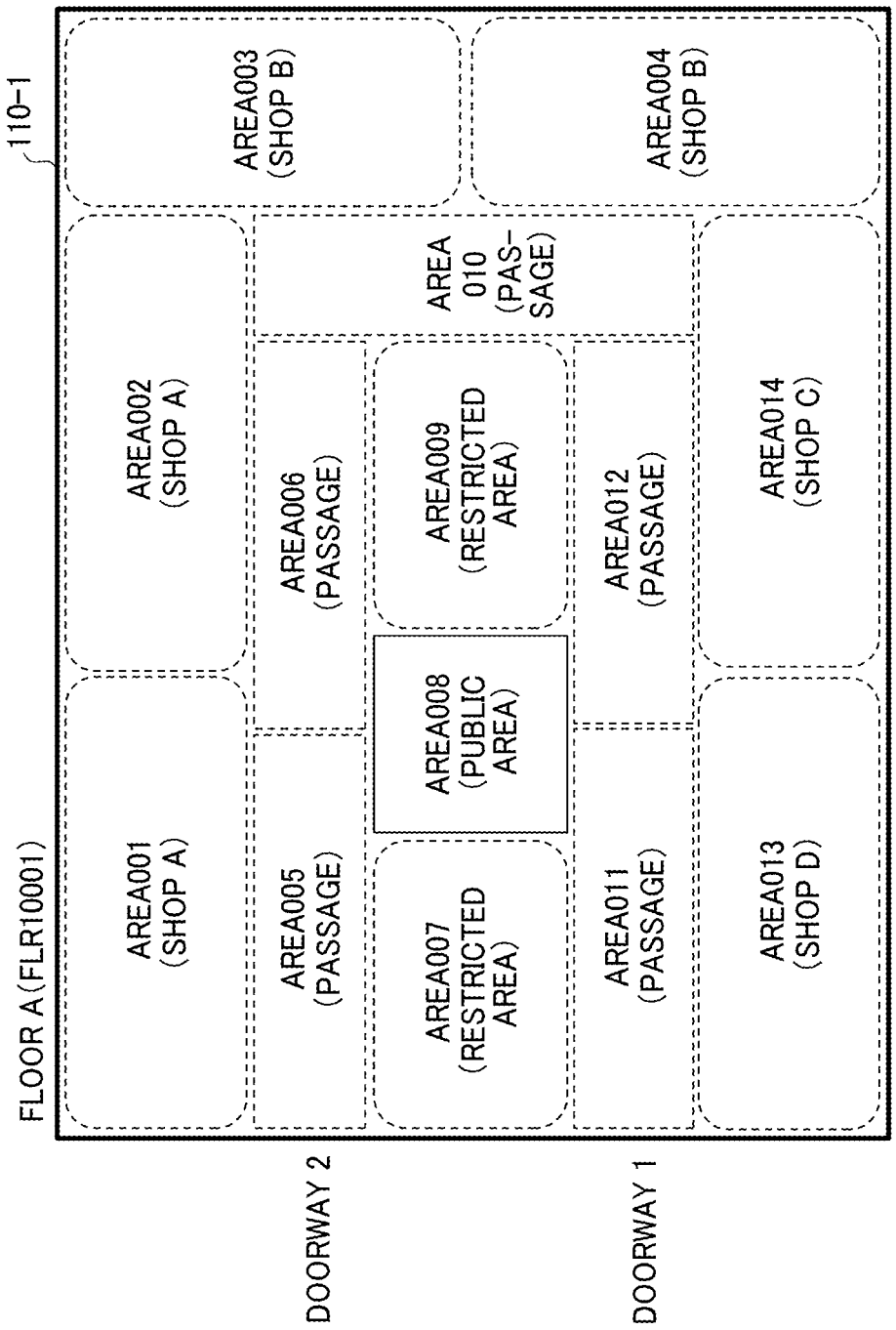
FIG. 4 is an example layout of areas in the floor illustrated in FIG. 3.

FIG. 4 is an example layout of areas on the floor on which the positioning device 101 is installed. In the example illustrated in FIG. 4, the floor A 110-1 is divided in a plurality of areas, and each area is assigned with an area ID for identifying the area. In FIG. 4, area IDs AREA001, AREA002, AREA003, AREA004, AREA005, AREA006, AREA007, AREA008, AREA009, AREA010, AREA011, AREA012, AREA013, and AREA014 are assigned to the areas, respectively.

The areas are categorized into, for example, "Shop", "Passage", "Restricted Area", and "Public Area".

For example, the area category "shop" represents the areas of the shop A to D illustrated in FIG. 3 and indicates a shop area open to visitors and customers. The area category "passage" represents the area of the passage illustrated in FIG. 3 and indicates that visitors and customers can pass that area freely. The area category "restricted area" is applied to the restricted areas A and B illustrated in FIG. 3, which are controlled by a manager or a caretaker of the facilities and are not open to visitors and customers, for example. The area category "public area" is applied to, for example, the hot-water supply room and the WC illustrated in FIG. 3 and indicates areas open to visitors and customers.

When the information terminal 104 calculates the current position thereof with the PDR, the information terminal 104 can use the area category to limit the areas to the areas open to the user 105, thereby improving the accuracy in map matching and the like.

The facility 200, the floor A 110-1, the areas, and the area categories illustrated in FIGS. 2 to 4 are mere examples.

Positioning Library

Descriptions are given below of a positioning library to perform predetermined processing using the position ID included in the sound wave. For example, the predetermined processing includes position information registration, which involves identifying the position information of the information terminal 104 and transmitting the position information to the management server 106.

Figure 5:
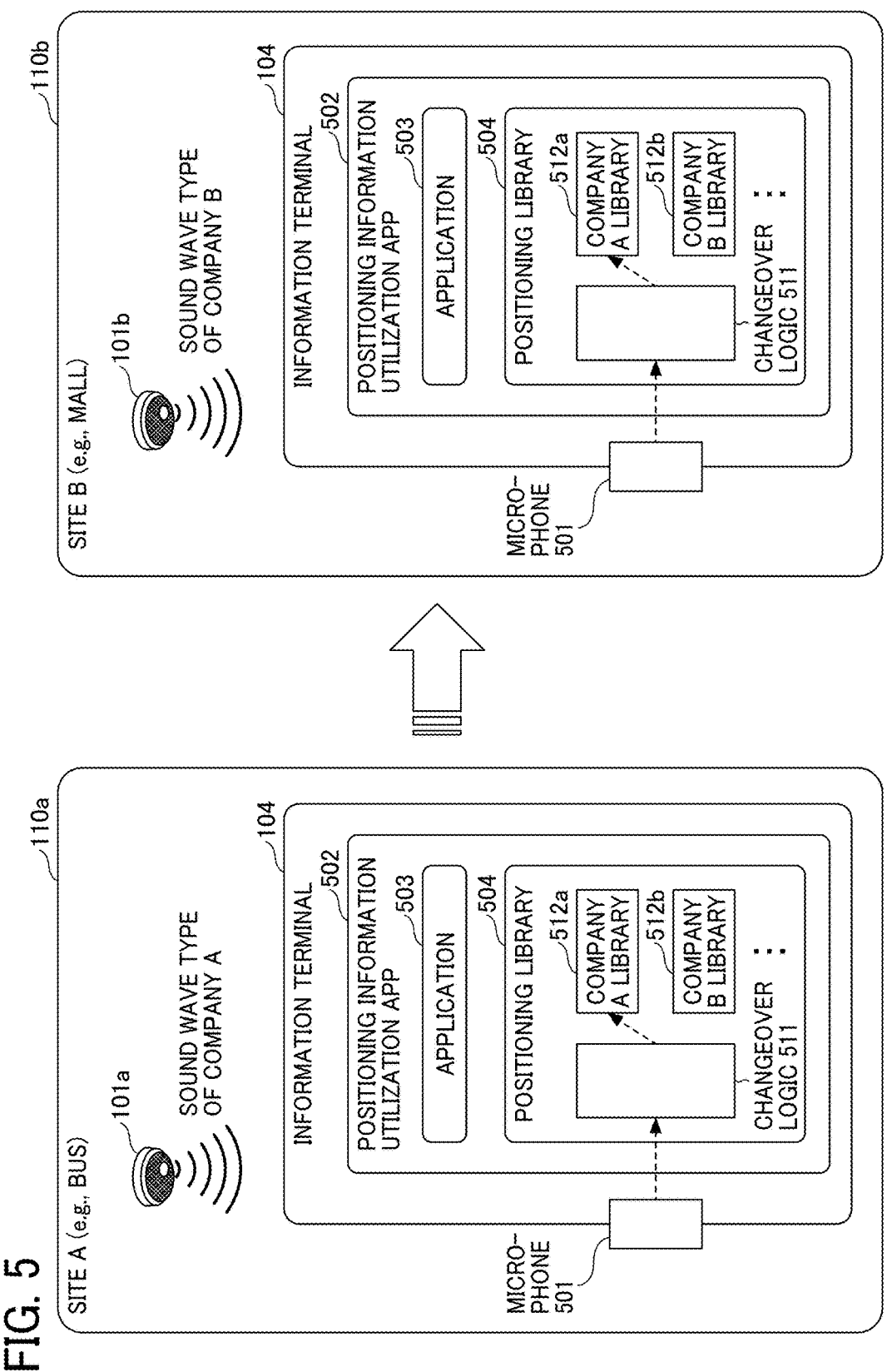
FIG. 5 is an illustration for explaining a positioning library according to an embodiment.

FIG. 5 is an illustration for explaining a positioning library according to the present embodiment. The position information is supplied by a service provider or the like using the information processing system 100. It is preferable that such a service provider supplies a positioning library 504 to an App developer who develops an App utilizing the position information, which is hereinafter referred to as "positioning information utilization App 502" (illustrated in FIG. 5). The positioning library 504 executes predetermined processing using the position ID based on the sound wave output from the positioning device 101.

Being supplied with the positioning library 504, the App developer can combine a developed application 503 with the positioning library 504, thereby constructing the positioning information utilization App 502, to facilitate use of the position information supplied from the information processing system 100.

However, for example, in large facilities such as a shopping mall, schemes (e.g., demodulation, encryption, and frequency allocation schemes) of sound waves including position IDs may differ depending on the site of the positioning device 101.

In the example illustrated in FIG. 5, a sound wave in company A type (hereinafter "company A sound wave") is output in a site A 110*a* (e.g., a bus), while a sound wave in company B type (hereinafter "company B sound wave") is output at a site B 110*b* (e.g., a mall). Here, a positioning library accommodating the company A sound wave is hereinafter referred to "company A library", and a positioning library accommodating the company B sound wave is hereinafter referred to a "company B library"). For example, if the positioning information utilization App 502 includes only the company A library, the App becomes incapable of acquiring the position ID included in the sound wave to execute the predetermined processing.

Therefore, the positioning library 504 according to the present embodiment includes a plurality of positioning libraries (a plurality of function modules), such as a company A library 512*a* and a company B library 512*b*, to acquire, in different schemes from each other, position IDs from the sound waves output from the positioning devices 101, to execute the predetermined processing.

Additionally, in the present embodiment, the site information on the site A 110*a*, acquired by the information terminal 104 from the management server 106, includes specifying information to specify the company A library 512*a* that is the positioning library capable of executing the predetermined processing in the site A 110*a*. Similarly, the site information of the site B 110*b*, acquired by the information terminal 104 from the management server 106, includes specifying information to specify the company B library 512*b* as the positioning library capable of executing the predetermined processing in the site B 110*b*.

Further, the positioning library 504 according to the present embodiment includes a changeover logic 511 (an execution controller) to cause the positioning library (processing executing unit), specified by the specifying information included in the site information acquired by the information terminal 104, to execute the predetermined processing.

Accordingly, for example, as the information terminal 104 enters the site A 110*a*, the changeover logic 511 of the positioning library 504 causes the company A library 512*a*, specified by the specifying information, to execute the predetermined processing. Similarly, as the information terminal 104 enters the site B 110*b*, the changeover logic 511 of the positioning library 504 causes the company B library 512*b*, specified by the specifying information, to execute the predetermined processing.

Note that the predetermined processing executed by the positioning library 504 includes, at least, extracting the position ID from the sound wave output from the positioning device 101.

Preferably, the predetermined processing executed by the positioning library 504 includes identifying the position information using the position ID and transmitting the position information of the information terminal 104 to the management server 106.

Thus, according to the present embodiment, the information terminal 104 (a terminal device) can acquire information from sound waves output in a plurality of different types, from the positioning devices 101, to execute the predetermined processing.

Hardware Configuration

Descriptions are given below of hardware configurations of the information terminal 104 and the management server 106.

Hardware Configuration of Information Terminal

Figure 6:
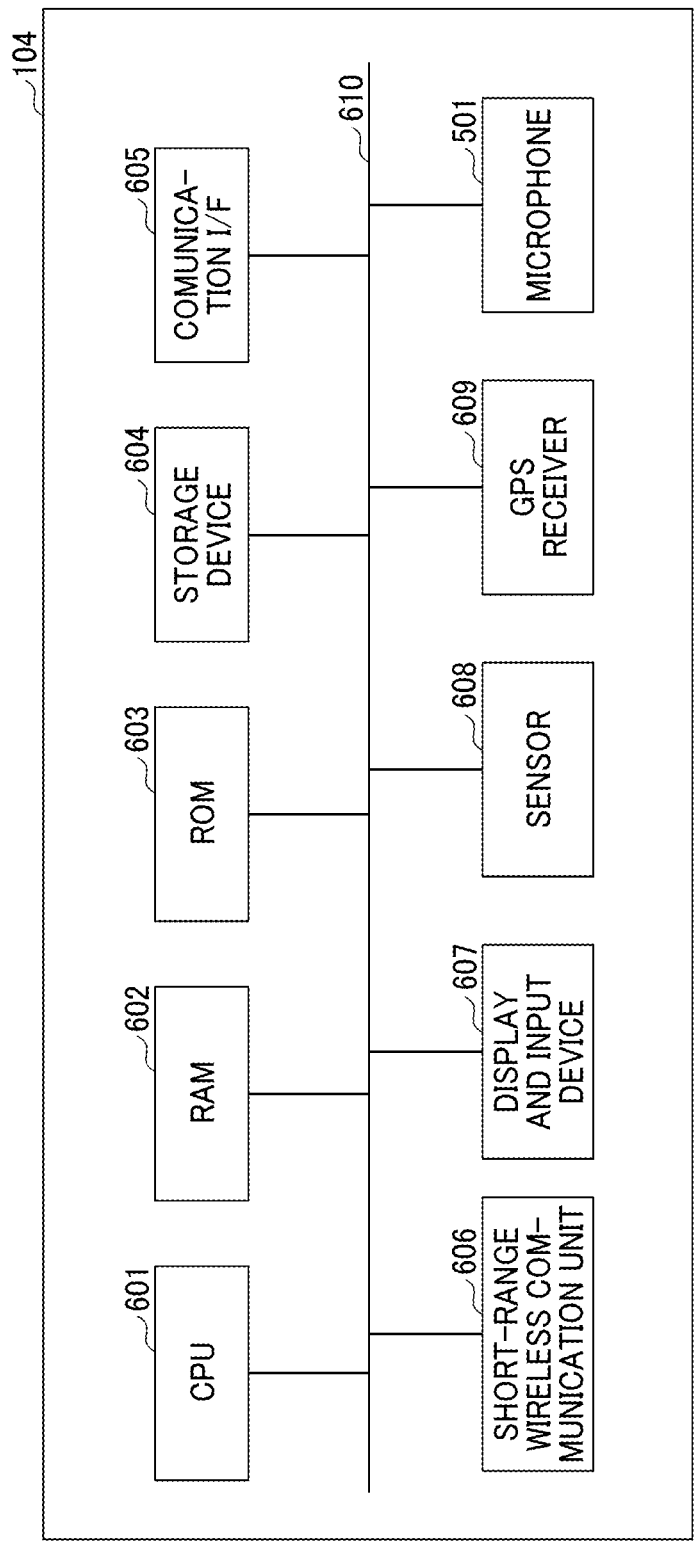
FIG. 6 is a block diagram illustrating an example hardware configuration of an information terminal according to an embodiment.

FIG. 6 is a block diagram illustrating an example hardware configuration of the information terminal 104 according to the present embodiment. The information terminal 104 has a structure of a general-purpose (generic) computer. For example, the information terminal 104 includes a central processing unit (CPU) 601, a random access memory (RAM) 602, a read only memory (ROM) 603, a storage device 604 (e.g., a memory), a communication interface (I/F) 605, a short-range wireless communication unit 606, a display and input device 607, a sensor 608, a global positioning system (GPS) receiver 609, a microphone 501, and a bus 610.

The CPU 601 is a processor that reads out programs and data stored in, for example, the ROM 603 and the storage device 604 to the RAM 602 and executes processing to implement functions of the information terminal 104. The RAM 602 is a volatile memory to be used as a work area for the CPU 601. The ROM 603 is a non-volatile memory that can keep storing the programs and the data even after turned off and back on.

The storage device 604 is, for example, a memory such as a solid state drive (SSD) or a flash ROM, and stores an operating system (OS), an application program, and various types of data.

The communication IIF 605 connects the information terminal 104 to the network 120 via wireless communication such as a wireless LAN or LTE.

The short-range wireless communication unit 606 is a communication circuit for wireless communication, to receive, by short-range wireless communication such as BLE, a radio wave including the position ID transmitted from the positioning device 101. BLE, which is one of extensions of Bluetooth (short-range wireless communication technology), is designed as a part of Bluetooth 4.0 standards. BLE enables data communication by short-range wireless communication with reduced power consumption compared with standard Bluetooth communication.

The BLE device (the positioning device 101) can transmit, in broadcasting, a packet called advertising packet at predetermined intervals (e.g., at 100 ms). The advertising packet is for advertising the presence thereof. The advertising packet specifies data elements (manufacturer specific data) for which the provider of the BLE device stipulates a unique format to use the data elements. The positioning device 101 broadcasts a radio wave including the access information for acquiring the site information to the area therearound, using the advertising packet.

Note that BLE is one example of wireless communication for the positioning device 101 to transmit the radio wave including the access information. The short-range wireless communication unit 606 of the information terminal 104 receives the radio wave including the access information in the same wireless communication type as the radio wave transmitted from the positioning device 101.

The display and input device 607 includes, for example, a display device such as a liquid crystal display (LCD) and an input device such as a touch panel. The display and input device 607 accepts inputs from the user and provides a display screen by a program executed by the information terminal 104.

The sensor 608 is, for example, an accelerometer or a geomagnetic sensor, to acquire data to calculate the distance of travel of the information terminal 104.

The GPS receiver 609 is a positioning device, mainly used outdoors, to receive a positioning signal transmitted from a GPS and output the position information or data for calculating the position information.

The microphone 501 is a device for acquiring the sound wave and includes a sound pickup element such as a microphone. The microphone 501 converts the sound wave acquired with the microphone into a sound signal and further into sound data in a predetermined format as required and outputs the sound signal or sound data.

The bus 610 is connected to each of the above-described elements and transmits address signals, data signals, and various types of control signals.

Hardware Configuration of Management Server

Figure 7:
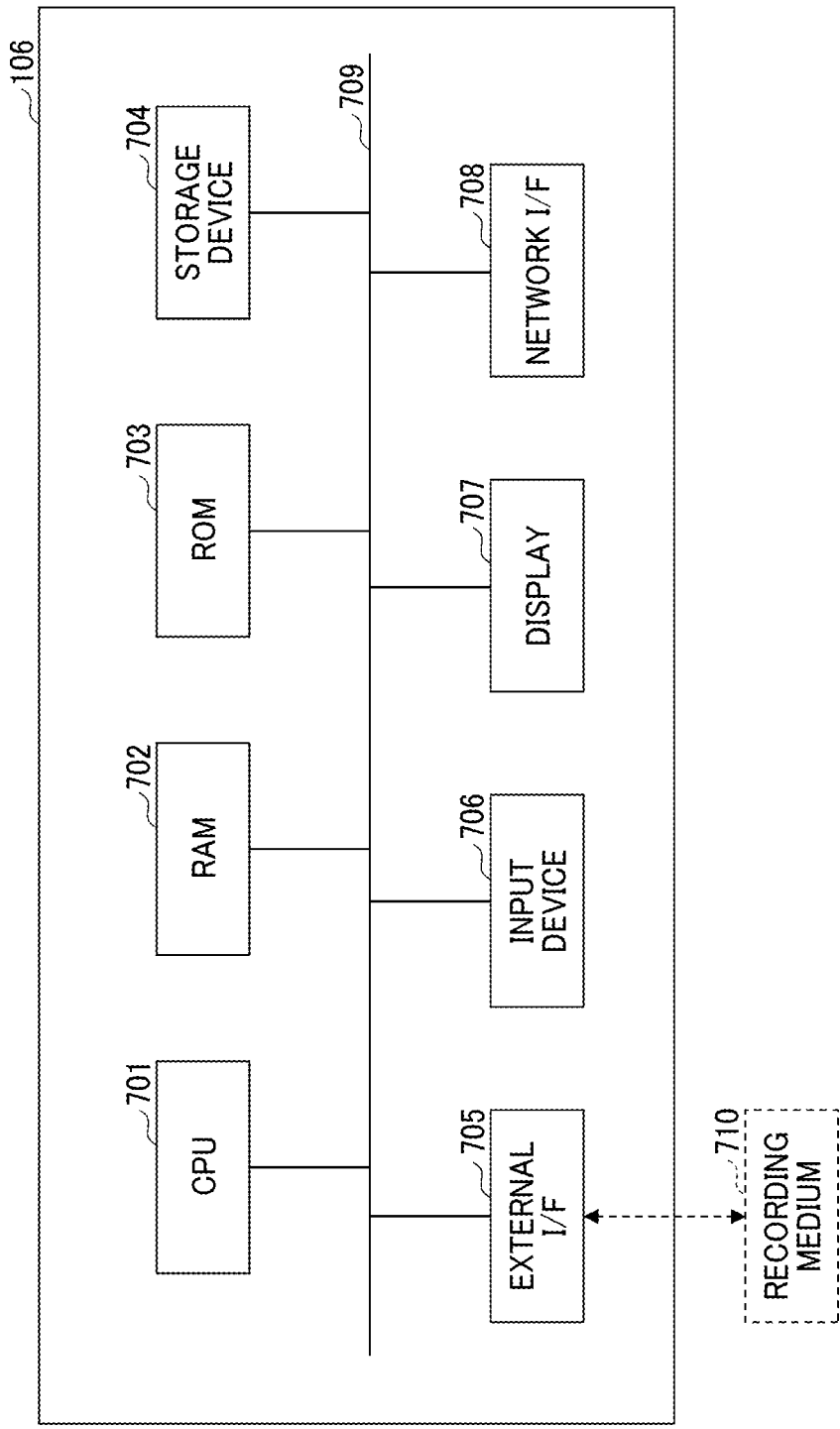
FIG. 7 is a block diagram illustrating a hardware configuration of a management server of the information processing system illustrated in FIG. 1.

FIG. 7 is a block diagram illustrating a hardware configuration of the management server 106. The management server 106 includes, for example, a CPU 701, a RAM 702, a ROM 703 a storage device 704 (e.g., a memory) an external interface (I/F) 705, an input device 706 (an input device), a display 707, a network I/F 708, and a bus 709.

The CPU 701 is a processor that reads out programs and data from, for example, the ROM 703 and the storage device 704 to the RAM 702, and executes processing to implement functions of the management server 106. The RAM 702 is a volatile memory to be used as a work area for the CPU 701. The ROM 703 is a non-volatile memory that can keep storing the programs and the data even after turned off and back on.

The storage device 704 is a memory device such as a hard disk drive (HDD) or a solid state drive (SSD) and stores an operating system (OS), an application program, and various types of data.

The external I/F 705 is an interface with an external device. The external device includes, for example, a recording medium 710. The management server 106 stores a predetermined program, for example, in the recording medium 710 and installs the program from the recording medium 710 on the management server 106 via the external I/F 705. Then, the program is capable of executing.

The input device 706 is a device, such as a pointing device, a keyboard, or a touch panel, for a user to input instructions and data into the management server 106. The display 707 is a device for displaying results of processing and the like performed by the management server 106.

The network I/F 708 is a communication interface, such as a wired or wireless WAN, for connecting the management server 106 to the network 120.

The bus 709 is connected to each of the above-described elements and transmits address signals, data signals, and various types of control signals.

Hardware Configuration of Other Device

The positioning device 101 has a configuration of a general-purpose computer and includes, for example, a CPU, a RAM, a ROM, and a flash ROM. The positioning device 101 further includes a wireless communication I/F to communicate with the wireless gateway 102, a short-range wireless I/F to transmit the radio wave including the access information, an output to output a sound wave including a position ID, and a flash ROM to store the access information and the position ID.

The wireless gateway 102 has a configuration of a general-purpose computer and includes, for example, a CPU, a RAM, a ROM, and a flash ROM. The wireless gateway 102 further includes a wireless communication I/F to communicate with the positioning device 101 and a communication I/F to communicate with an external gateway.

The external gateway 103 has a configuration of a general-purpose computer and includes, for example, a CPU, a RAM, a ROM, and a flash ROM. The external gateway 103 further includes a communication I/F to communicate with the wireless gateway 102 and a network I/F to connect to the network 120.

Functional Configuration

Figure 8:
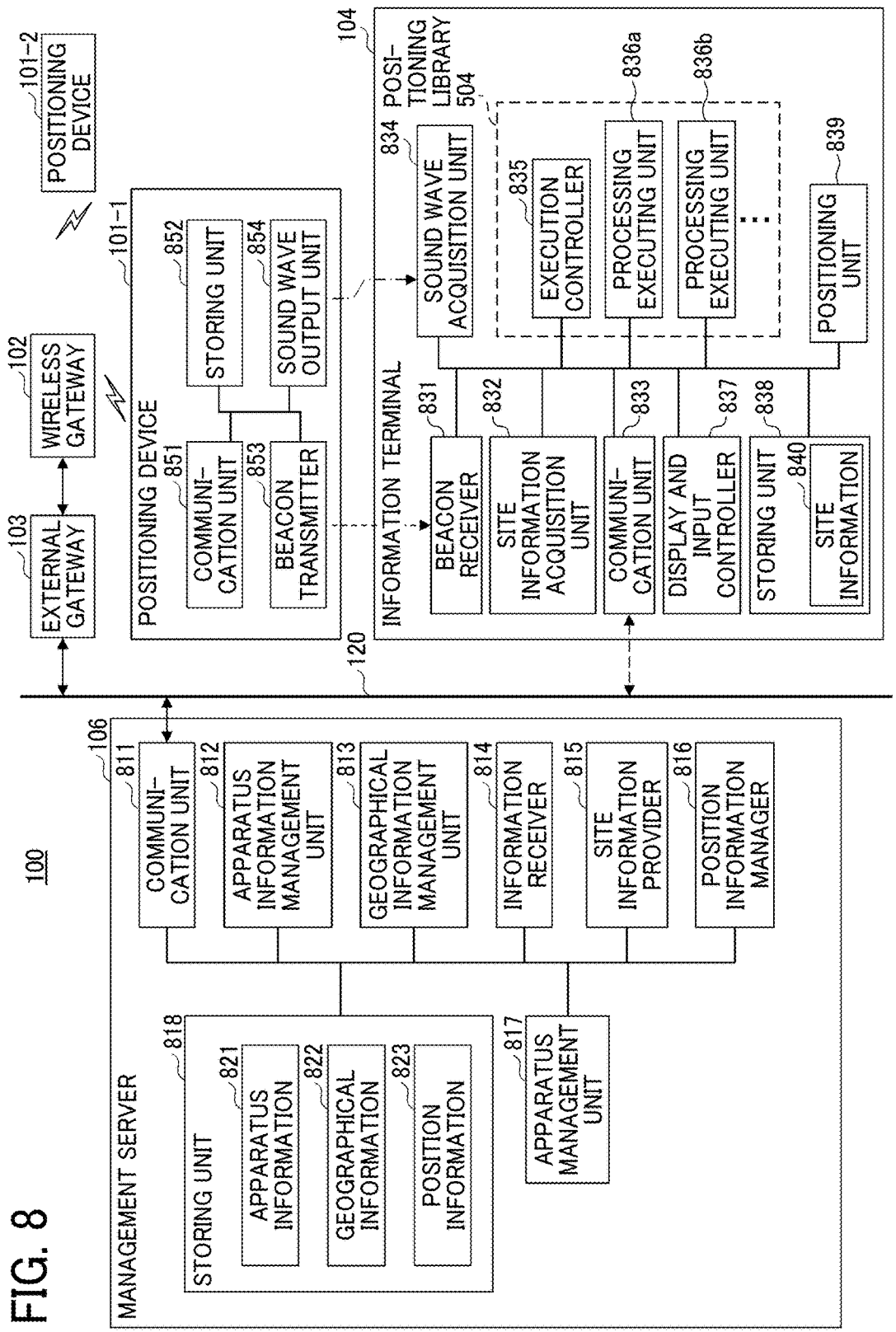
FIG. 8 is a functional block diagram of the information processing system illustrated in FIG. 1.

FIG. 8 is a functional block diagram of the information processing system 100 according to the present embodiment. The information processing system 100 includes the plurality of positioning devices 101 (e.g., 101-1 and 101-2), the wireless gateway 102, the external gateway 103, the information terminal 104, and the management server 106.

Functional Configuration of Management Server

The management server 106 (the information processing apparatus) includes a communication unit 811, an apparatus information management unit 812, a geographical information management unit 813, an information receiver 814, a site information provider 815, a position information manager 816, an apparatus management unit 817, and a storing unit 818.

The communication unit 811 is implemented, for example, by a program executed by the CPU 701 illustrated in FIG. 7 and the network UF 708. The communication unit 811 connects the management server 106 to the network 120 and controls the communication with the information terminal 104, the external gateway 103, and the positioning devices 101.

The apparatus information management unit 812 is implemented, for example, by a program executed by the CPU 701 illustrated in FIG. 7. The apparatus information management unit 812 manages apparatus information 821, for each site provided with the positioning device 101. In the apparatus information 821, a position identification (ID) of the positioning device 101 placed on each site is associated with coordinate data specifying the location of the positioning device 101. Note that the apparatus information 821 according to the present embodiment includes the library ID that is data for identifying a processing executing unit (the positioning library) that can execute the predetermined processing in each site.

The apparatus information management unit 812 is one example of a site information manager to manage the site information including the specifying information for specifying the processing executing unit that can execute the predetermined processing in each of the sites equipped with the positioning devices 101. The library ID is one example of the specifying information.

FIGS. 10AA and 10AB illustrate an example of the apparatus information 821 managed by the apparatus information management unit 812. In the example illustrated in FIGS. 10AA and 10AB, the apparatus information 821 includes data such as "Location (e.g., site name or identification)", "Device ID", "Floor ID", "Area ID", "Installation Position (latitude, longitude, and altitude)", "Position ID", "Access Information", "Encryption Key", "Library ID", and "Library Type".

The site in FIGS. 10AA and 10AB represents a site name or information such as identification data. The device ID is data for identifying the positioning device 101 and is a fixed ID that is not basically rewritten.

The floor ID is identification data for identifying the floor on which the positioning device 101 is installed. The area ID is identification data for identifying the area in which the positioning device 101 is installed. The installation position (latitude, longitude, and altitude) is represented by coordinates of the location of the positioning device 101. In the present embodiment, the coordinate data is represented in three-dimensional coordinates of latitude, longitude, and altitude.

The position ID is identification data unique to each positioning device 101 and included in the sound wave output from the positioning device 101.

Preferably, the apparatus management unit 817 of the management server 106 changes the position ID at predetermined intervals (e.g., 24 hours) or at a scheduled time of day.

The access information is information for acquiring the site information on the site where the positioning device 101 is placed and is, for example, uniform resource locator (URL). The encryption key is a key for encrypting the access information.

The library ID is information (processing identification data) for identifying one or more of a plurality of processing executing units 836a, 836a, and so on (hereinafter collectively "processing executing units 836") of the information terminal 104 that can execute the predetermined processing in each site.

As illustrated in FIGS. 10AA and 10AB, the library ID can be stored in association with either the site (e.g., the site A) or the position ID of the positioning device 101 (e.g., of the site B).

Thus, as the apparatus information 821, the apparatus management unit 817 can manage either the association between the site And the library ID or the association between the position ID and the library ID.

The library type represents the types of the plurality of processing executing units 836.

Thus, the apparatus information management unit 812 according to the present embodiment manages the apparatus information 821 (one example site information) including the library ID (specifying information), which identifies the processing executing unit 836 capable of executing the predetermined processing in each site.

Referring back to FIG. 8, the functional configuration of the management server 106 is further described.

The geographical information management unit 813 is implemented, for example, by a program executed by the CPU 701 illustrated in FIG. 7. The geographical information management unit 813 manages geographical information 822 including information on a map of the site, for each of the sites where the positioning device 101 is installed. FIGS. 11A, 11B, and 11C illustrate examples of the geographical information 822 managed by the geographical information management unit 813. For example, the geographical information 822 includes floor information 1101, area information 1102, and map information 1103 illustrated in FIGS. 11A to 11C.

FIG. 11A illustrates an example of the floor information 1101. In the example illustrated in FIG. 11A, the floor information 1101 is information on floors in the site And includes "Facilities", "Floor ID", "Floor Name", "Story", and "Altitude".

The information "facilities" is facility name or data for identifying the facility. The floor ID is data for identifying each floor included in the facility. The floor name is the name or the like of the floor. The story is the story number of the floor. The altitude is represented, for example, in meters.

FIG. 11B illustrates an example of the area information 1102. In the example illustrated in FIG. 11B, the area information 1102 is information on the areas of each floor and includes "Floor ID", "Area Category", "Map ID", and "Area Width×Depth".

The floor ID is data for identifying each floor. The area ID is data for identifying each area on the floor. The area category represents the category of each area described above with reference to FIG. 4. The map ID is data for identifying map data (e.g., an image file of map) corresponding to each area (or each floor). The area width×depth represents area size.

FIG. 11C illustrates an example of map information. The map information 1103 includes data on a map corresponding to each area and includes "Map ID", "Image File URL", "Reference Point (latitude and longitude)", "Relative Position (x-direction and Y direction)", "Scale", and "Rotation Angle" in the example illustrated in FIG. 11C.

The map ID is data for identifying the map (map data). The image file URL is URL and the like for acquiring the map. The reference point (latitude and longitude) represents a point as a reference for the map. The relative position (x-direction and y-direction) represents the position on the map relative to the reference point. The scale represents the scale of the map. The rotation angle is the angle of the map.

Note that the floor information 1101, the area information 1102, and the map information 1103 illustrated in FIGS. 11A to 11C are examples of the geographical information 822 managed by the geographical information management unit 813. Alternatively, for example, the geographical information 822 managed by the geographical information management unit 813 can be one map data. The map information 1103 can include, instead of the image file URL, an image file or an image file name.

Referring back to FIG. 8, the functional configuration of the management server 106 is further described.

The information receiver 814 is implemented, for example, by the CPU 701 illustrated in FIG. 7 and receives data and requests (e.g., acquisition request for site information and request for registering position information) transmitted from the information terminal 104.

The site information provider 815 is implemented, for example, by the CPU 701 illustrated in FIG. 7. In response to the acquisition request for the site information received by the information receiver 814, the site information provider 815 supplies (transmits) the requested site information to the information terminal 104 requesting that information. The site information supplied by the site information provider 815 includes, at least, the apparatus information 821 managed by the apparatus information management unit 812.

Preferably, the site information supplied by the site information provider 815 includes the geographical information 822 (the floor information 1101, the area information 1102, and the map information 1103) managed by the geographical information management unit 813.

The position information manager 816 is implemented, for example, by a program executed by the CPU 701 illustrated in FIG. 7. In response to the registration request for the position information received by the information receiver 814, the position information manager 816 stores the position information of the information terminal 104 in the storing unit 818 and manages the position information.

FIG. 10B illustrates an example of position information 823 managed by the position information manager 816. In the example illustrated in FIG. 10B, the position information 823 includes "App ID", "Positioning Time", "Coordinate Data", "Floor ID", "Area ID", "Direction", and "Travel Speed".

The App ID is one example of terminal identification data for identifying the information terminal 104. When an App corresponding to the information processing system 100 is installed on the information terminal 104, the App generates an App ID that is identification data unique to each App. Owing to the App ID, the information processing system 100 can identify the information terminal 104 or the user 105 using the information terminal 104 without using personal data such as telephone number and email address. However, this is an example, and the information terminal 104 can use the identification data of the information terminal 104 or the identification data of the user, instead of the App ID.

The positioning time represents the time at which the coordinate data is generated. The coordinate data specifies the position of the information terminal 104 and represented, for example, in three-dimensional coordinates of latitude, longitude, and altitude. The floor ID represents the floor corresponding to the coordinates calculated or determined by the information terminal 104. The area ID represents the area corresponding to the coordinates calculated or determined by the information terminal 104.

The direction is the direction or orientation measured or determined by the information terminal 104 and represented, for example, in an angle relative to the north. The travel speed is the speed of travel of the information terminal 104, measured or calculated by the information terminal 104, and represented, for example, in meters per 1 minute.

Referring back to FIG. 8, the functional configuration of the management server 106 is further described.

The apparatus management unit 817 is implemented, for example, by a program executed by the CPU 701 illustrated in FIG. 7. The apparatus management unit 817 manages the plurality of positioning devices 101 of the information processing system 100. For example, the apparatus management unit 817 alters the position ID of the apparatus information 821 (e.g., illustrated in FIGS. 10AA and 10AB) at predetermined intervals (or at a predetermined time of day) and notifies each positioning device 101 of the altered position ID.

Figure 9:
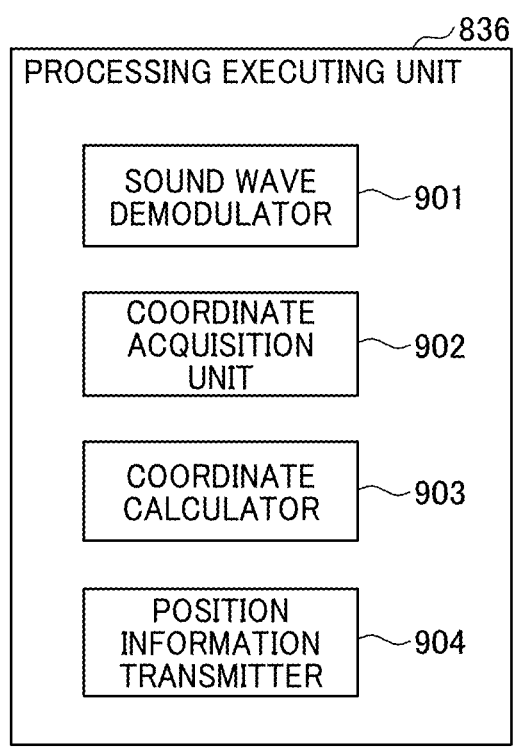
FIG. 9 is a functional block diagram of a processing executing unit illustrated in FIG. 8.

The storing unit 818 is implemented, for example, by a program executed by the CPU 701 illustrated in FIG. 7 and the storage device 704, and stores the apparatus information 821, the geographical information 822, and the position information 823. Note that the configuration of the management server 106 illustrated in FIG. 9 is one example. Alternatively, the components of the management server 106 can be divided into a plurality of information processing apparatuses.

Functional Configuration of Information Terminal

As illustrated in FIG. 8, the information terminal 104 includes a beacon receiver 831, a site information acquisition unit 832, a communication unit 833, a sound wave acquisition unit 834, an execution controller 835, the plurality of processing executing units 836a, 836a, and so on (collectively "processing executing units 836"), a display and input controller 837, a storing unit 838, a positioning unit 839, and the like. In the description below, a given one of the plurality of processing executing units 836a, 836b, and so on is referred to as "processing executing unit 836".

The beacon receiver 831 (the radio wave receiver) is implemented, for example, by a program executed by the CPU 601 and the short-range wireless communication unit 606 illustrated in FIG. 6. The beacon receiver 831 receives the beacon (radio wave) transmitted from the positioning device 101 and acquires the access information included in the beacon.

The site information acquisition unit 832 is implemented, for example, by a program executed by the CPU 601 illustrated in FIG. 6 and acquires, from the management server 106 (first information processing apparatus) managing the site information of each site, the site information of the site corresponding to the position of the information terminal 104. For example, the site information acquisition unit 832 uses the access information acquired by the beacon receiver 831 to request the management server 106 the acquisition of the site information. The site information acquisition unit 832 acquires the site information 840 transmitted from the management server 106 and stores the site information 840 in the storing unit 838.

Preferably, the site information acquisition unit 832 acquires the site information 840 from the management server 106 when the storing unit 838 does not store the site information 840 corresponding to the access information acquired by the beacon receiver 831 (the site information 840 is not yet acquired).

At that time, the site information 840 transmitted from the management server 106 includes information on the site (e.g., the site A) where the positioning device 101 is installed that has transmitted the beacon, of the apparatus information 821 illustrated in FIGS. 10AA and 10AB.

Preferably, the apparatus information 821 regarding the site (e.g., the site A) where the positioning device 101 is installed that has transmitted the beacon includes the position ID of every positioning device 101 placed on that site (e.g., the site A) and the position information of each positioning device 101.

Preferably, the site information 840 transmitted from the management server 106 includes, for example, the geographic information including the floor information 1101, the area information 1102, and the map information 1103 illustrated in FIGS. 11A to 11C.

As described above, the site information 840 received by the site information acquisition unit 832 from the management server 106 includes various types of information necessary for the information terminal 104 to identify the position thereof in the site corresponding to the position of the information terminal 104.

The communication unit 833 is implemented, for example, by a program executed by the CPU 601 illustrated in FIG. 6, the communication I/F 605, and the like. The communication unit 811 connects the information terminal 104 to the network 120 and controls communication with the management server 106 and the like.

The sound wave acquisition unit 834 is implemented, for example, by a program executed by the CPU 601 illustrated in FIG. 6, the microphone 501, and the like, and acquires sound waves around the information terminal 104 with the microphone 501.

The execution controller 835 is implemented, for example, by a program (the positioning library 504 illustrated in FIG. 5 and the like) executed by the CPU 601 illustrated in FIG. 6 and corresponds to the changeover logic 511 described above with reference to FIG. 5. The execution controller 835 causes the processing executing unit 836, of the plurality of processing executing units 836a, 836a, and so on, specified by the library ID (specifying information) included in the site information 840 acquired by the site information acquisition unit 832.

The plurality of processing executing units 836 are implemented, for example, by a program (the positioning library 504 illustrated in FIG. 5 and the like) executed by the CPU 601 illustrated in FIG. 6 and correspond to the company A library 512a, the company B library 512b, and so on illustrated in FIG. 5, respectively. The plurality of processing executing units 836 acquire the position IDs from the sound waves, acquired in schemes different from each other by the sound wave acquisition unit 834, and execute the predetermined processing.

FIG. 9 is a functional block diagram of the processing executing unit 836 according to the present embodiment. In one example illustrated in FIG. 9, the processing executing unit 836 includes a sound wave demodulator 901, a coordinate acquisition unit 902, a coordinate calculator 903, and a position information transmitter 904.

The sound wave demodulator 901 demodulates the sound wave, acquired by the sound wave acquisition unit 834, in a scheme (e.g., demodulation, encryption, and frequency allocation) unique to each processing executing unit 836, to acquire the information such as the position ID.

For example, in the site A 110a, the processing executing unit 836a (the company A library 512a) demodulates the sound wave output from a positioning device 101a in the company A scheme, to acquire the information such as the position ID. Similarly, in the site B 110b, the processing executing unit 836b (the company B library 512b) demodulatesx the sound wave output from a positioning device 101b in the company B scheme, to acquire the information such as the position ID.

The coordinate acquisition unit 902 uses the position ID acquired by the sound wave demodulator 901 and the site information 840 acquired by the site information acquisition unit 832, to acquire the coordinates of the information terminal 104.

For example, the site information 840 acquired by the site information acquisition unit 832 includes the apparatus information in the site A illustrated in FIGS. 10AA and 10AB. Assuming that the position ID acquired by the sound wave demodulator 901 is "SP1001", the coordinate acquisition unit 902 retrieves, from the apparatus information 821, the installation position (longitude, latitude, and altitude) associated with the position ID "SP1001", thereby acquiring the coordinates specifying the position of the information terminal 104.

The coordinate calculator 903 calculates the coordinates of the current position of the information terminal 104 by the above-described PDR relative to the coordinates acquired by the coordinate acquisition unit 902 being the origin. For example, with the sensor 608 such as an accelerometer or a geomagnetic sensor, the coordinate calculator 903 calculates the direction and distance of travel of the information terminal 104 from the coordinates acquired by the coordinate acquisition unit 902 being the origin, and calculates the current position of the information terminal 104.

As the coordinate acquisition unit 902 acquires renewed coordinates based on the position ID acquired by the sound wave demodulator 901, the coordinate calculator 903 initializes the calculated distance of travel. Then, the coordinate calculator 903 starts again calculating the current position of the infomiation terminal 104 with the PDR relative to the renewed coordinates being the origin.

The position information transmitter 904 transmits, to the management server 106, the coordinates (hereinafter "position information") indicating the current position of the information terminal 104, determined by the coordinate acquisition unit 902 or the coordinate calculator 903, and the registration request of the App ID of the information terminal 104.

Note that the functional configuration of the processing executing unit 836 illustrated in FIG. 9 is one example. Alternatively, at least a portion of the coordinate acquisition unit 902, the coordinate calculator 903, and the position information transmitter 904 can be shared by the plurality of processing executing units 836.

Referring back to FIG. 8, the functional configuration of the information terminal 104 is further described.

The display and input controller 837 is implemented, for example, by a program executed by the CPU 601 illustrated in FIG. 6 and controls screen display of the App on the display and input device 607 illustrated in FIG. 6 and reception of input from the user to the display and input device 607.

The storing unit 838 is implemented, for example, by a program executed by the CPU 601 illustrated in FIG. 6, the storage device 604, and the RAM 602 and stores the site information 840 and the like acquired by the site information acquisition unit 832.

Functional Configuration of Positioning Device

For example, each positioning device 101 (the positioning devices 101-1 and 101-2) executes, with a central processing unit (CPU) thereof, a predetermined program to implement a communication unit 851, a storing unit 852, a beacon transmitter 853, and a sound wave output unit 854.

For example, the communication unit 851 communicates with the management server 106 via the wireless gateway 102, the external gateway 103, and the like.

The configuration for communication is not limited thereto as long as the communication unit 851 can communicate with the management server 106. Alternatively, for example, the information processing system 100 can be without at least one of the wireless gateway 102 and the external gateway 103.

The storing unit 852 stores the information (e.g., the position ID and the access information) received from the management server 106.

The beacon transmitter 853 (the radio wave transmitter) transmits the beacon (radio wave) including the access information stored in the storing unit 852, in short-range wireless communication. For example, the beacon transmitter 853 transmits intermittently the advertising packet including the access information by BLE communication, at predetermined intervals (e.g., at 100-millisecond intervals).

The sound wave output unit 854 outputs the sound wave including the position ID stored in the storing unit 852, with a speaker.

Preferably, the position ID is transmitted in an inaudible frequency range (e.g., from 16 kHz to 20 kHz) higher than a predetermined frequency (e.g., about 16 kHz). The sound wave having a frequency equal to or greater than 16 kHz, which is rarely audible to human, is preferable for transmitting the position ID to the information terminal 104. Alternatively, the position ID can be output in an embedded form in audio data in an audible frequency range, using a technique such as digital watermark.

In the present embodiment, transfer scheme of the position ID is not limited. For example, the position ID can be transmitted with a sound wave modulated, in a known modulation scheme, to have an inaudible frequency range of 16 kHz or higher.

As another transfer scheme of the position ID, a sound wave having a predetermined frequency (e.g., 19 kHz) is switched between on and off to indicate digital values "1" and "0". In this case, the information terminal 104 receiving the sound wave can determine the presence or absence of the predetermined frequency at predetermined sampling rate to acquire the position ID included in the sound wave.

Functional Configuration of Other Device

The external gateway 103 and the wireless gateway 102 function to relay the communication between the management server 106 and the positioning device 101 and do not have a unique function. Thus, a detailed description thereof is omitted.

Flow of Processing A flow of information processing by the information processing system 100 will be described below.

Embodiment 1

Selection of Processing Executing Unit

Figure 12:
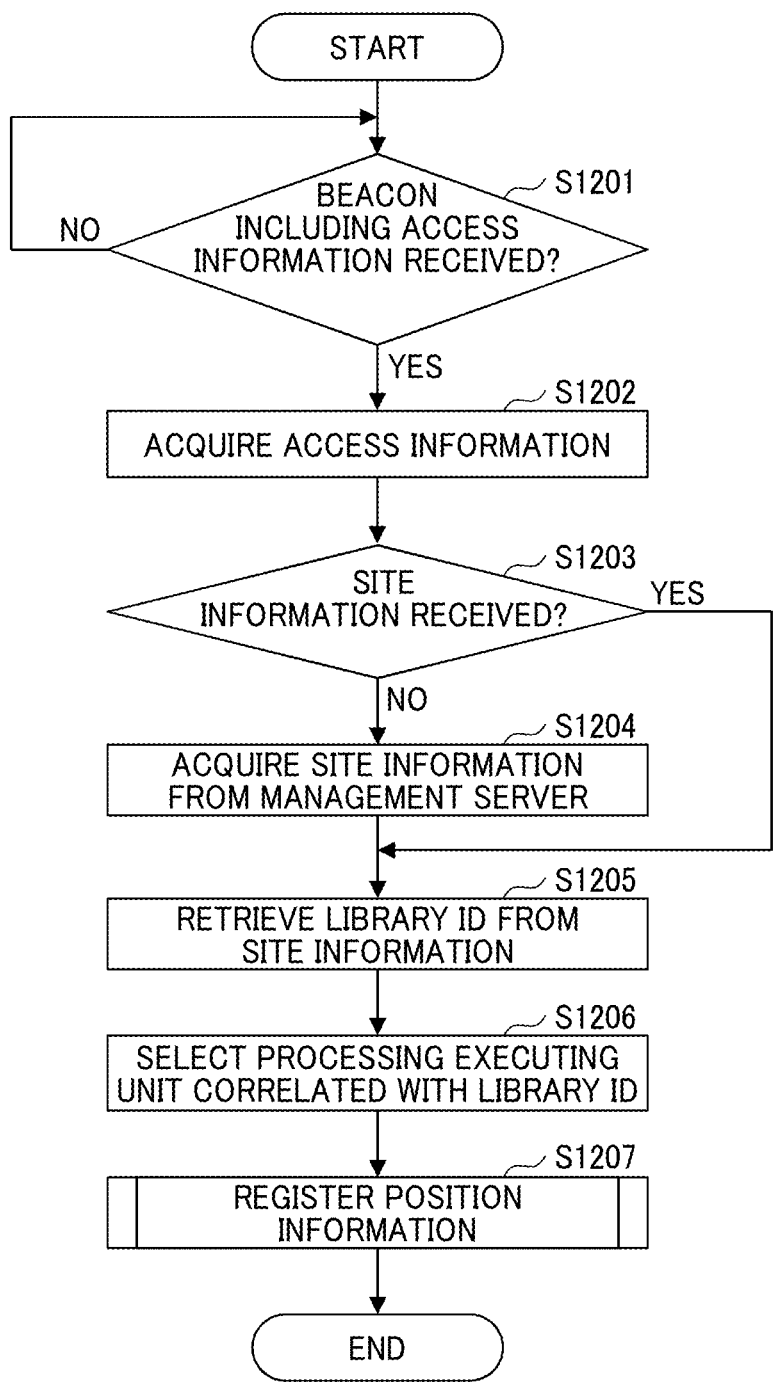
FIG. 12 is a flowchart illustrating an example of selection of processing executing unit, according to Embodiment 1.

FIG. 12 is a flowchart illustrating example of selection of processing executing unit according to Embodiment 1. In this example, the information terminal 104 selects, from the plurality of processing executing units 836, one processing executing unit 836 that is placed at the site corresponding to the position of the information terminal 104 and can execute predetermined processing.

At Step S1201, the site information acquisition unit 832 of the information terminal 104 determines whether the beacon receiver 831 has received a beacon including access information.

When the beacon including access information has been received, operation of the site information acquisition unit 832 proceeds to Step S1202. By contrast, when the beacon including access information has not been received, the process returns to Step S1201 and Step S1201 is repeated.

At Step S1202, the site information acquisition unit 832 acquires access information extracted from the beacon by the beacon receiver 831.

At Step S1203, the site information acquisition unit 832 determines whether the site information associated with the access information has been acquired at Step S1202.

When the site information has been acquired, the operation of the site information acquisition unit 832 proceeds to Step S1205. By contrast, when the site information has not been acquired, the site information acquisition unit 832 proceeds to Step S1204.

At Step S1204, the site information acquisition unit 832 uses the access information acquired at Step S1202 to acquire, from the management server 106, the site information on the site corresponding to the position of the information terminal 104.

For example, the site information acquisition unit 832 transmits the request for acquiring the site information to the URL indicated by the access information and stores the site information 840 transmitted from the management server 106 in the storing unit 838.

At Step S1205, the execution controller 835 of the information terminal 104 retrieves a library ID from the site information 840 stored in the storing unit 838.

The site information 840 stored in the storing unit 838 includes the information about the site (e.g., the site A) corresponding to the position of the information terminal 104, of the apparatus information 821 illustrated in FIGS. 10AA and 10AB, for example. The execution controller 835 retrieves, for example, the library ID "LIB00A" from the apparatus information about the site A.

At Step S1206, the execution controller 835 of the information terminal 104 selects, for example, the processing executing unit 836a, associated with the library ID retrieved at Step S1205 from the plurality of processing executing units 836 and causes the processing executing unit 836*a* to execute the predetermined processing.

At Step S1207, the processing executing unit 836 selected at Step S1206 executes registration of position information (one example of predetermined processing) described later with reference to FIG. 14.

With the above-described processing, the information terminal 104 selects the processing executing unit 836 capable of executing the predetermined processing in the site corresponding to the position of the information terminal 104, from the plurality of processing executing units 836 to acquire the position ID (unique to each positioning device 101) from the sound wave output from the positioning device 101 to execute the predetermined processing. Then, the information terminal 104 causes the selected processing executing unit 836 to execute the predetermined processing.

Example of Processing

FIGS. 13A and 13B are sequence charts illustrating an example of selection of processing executing unit according to Embodiment 1. This drawing illustrates one example of selection processing performed by the processing executing unit 836 when the information terminal 104 moves, for example, to the site A 110*a* and the site B 110*b* illustrated in FIG. 5.

At Step S1301, it is assumed that the user 105 carrying the information terminal 104 moves to the site A. Accordingly, the information terminal 104 moves to the site A. At Step S1302, at the site A 110*a*, the information terminal 104 can receive the beacon including the access information for acquiring the site information on the site A 110*a*, transmitted from the positioning device 101*a* placed at the site A 110*a*.

By contrast, at S1303, at the site A 110*a*, the information terminal 104 does not receive the beacon including the access information for acquiring the site information on the site B 110*b*, transmitted from the positioning device 101*b* installed in the site B 110*b*.

At S1304, in response to reception of the beacon including the access information to the site A, the site information acquisition unit 832 of the information terminal 104 determines whether the site information on the site A is stored in the storing unit 838. These processes correspond to Steps S1201 to S1203 in FIG. 12.

Here, the storing unit 838 does not store the site information of the site A, and the information terminal 104 performs process from Steps S1305 to S1307. By contrast, when the storing unit 838 stores the site information of the site A, the information terminal 104 does not perform the process from Steps S1305 to S1307.

At Step S1305, based on the access information to the site A included in the received beacon, the site information acquisition unit 832 of the information terminal 104 transmits, to the management server 106, the request for acquiring the loculation information of the site A.

At Step S1306, the site information provider 815 of the management server 106 accepting the request for acquiring the loculation information collects the site information on the site A. For example, the site information provider 815 collects data of the site A from the apparatus information 821 illustrated in FIGS. 10AA and 10AB and from the geographic information illustrated in FIGS. 11A to 11C.

At Step S1307, the site information provider 815 of the management server 106 transmits the collected data (apparatus information and geographic information) on the site A to the information terminal 104 requesting such information.

At Step S1308, the site information acquisition unit 832 of the information terminal 104 acquires the site information on the site A transmitted from the management server 106.

The execution controller 835 acquires the library ID "LIB00A" of the site A from the acquired site information.

Here, the library ID "LIB00A" of the site A represents the company A library 512*a* illustrated in FIG. 5 and the processing executing unit 836*a* illustrated in FIG. 8. Additionally, the library ID "LIB00B" of the site B represents the company B library 512*b* illustrated in FIG. 5 and the processing executing unit 836*b* illustrated in FIG. 8.

At Step S1309, the execution controller 835 of the information terminal 104 selects the company A library 512*a* illustrated in FIG. 5 (the processing executing unit 836*a* illustrated in FIG. 8) according to the library ID "LIB00A" of the site A acquired at Step S1308.

Figure 14:
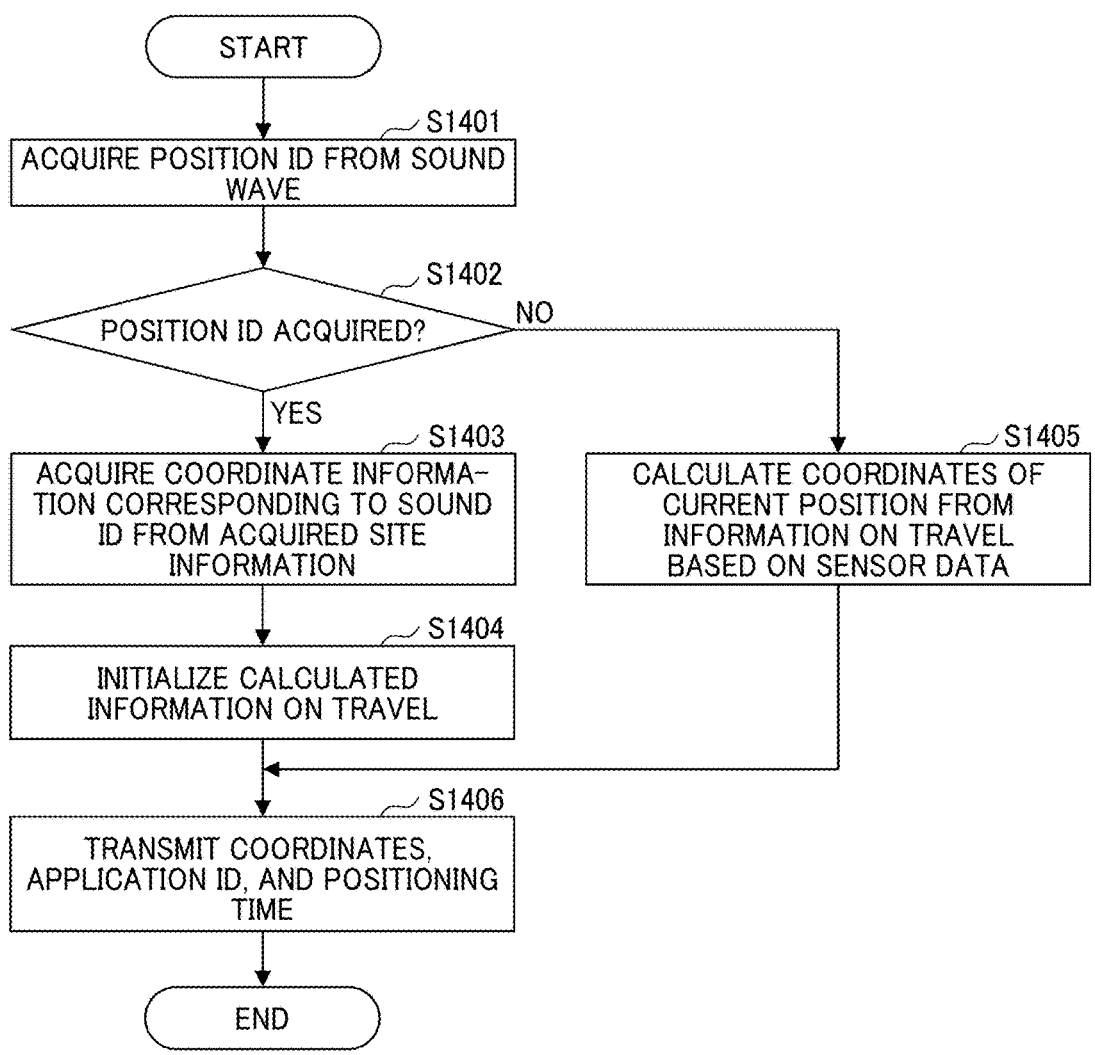
FIG. 14 is a flowchart illustrating example processing for registration of position information according to Embodiment 1.

At Step S1310, the selected company A library 512*a* (the processing executing unit 836*a*) executes the registration of the position information, for example, as illustrated in FIG. 14.

At Step S1311, it is assumed that the user 105 moves from the site A to the site B, and accordingly, the information terminal 104 carried thereby moves from the site A to the site B.

At Step S1312, at the site B, the information terminal 104 does not receive the beacon including the access information for acquiring the site information on the site A 110*a*, transmitted from the positioning device 101*a* installed in the site A 110*a*.

By contrast, at S1313, at the site B 110*b*, the information terminal 104 can receive the beacon including the access information for acquiring the site information on the site B 110*b*, transmitted from the positioning device 101*b* installed in the site B 110*b*.

At S1314, in response to reception of the beacon including the access information to the site B, the site information acquisition unit 832 of the information terminal 104 determines whether the site information on the site B is stored in the storing unit 838.

Here, since the storing unit 838 does not store the site information on the site B, the information terminal 104 performs process from Steps S1315 to S1317. By contrast, when it is determined that the storing unit 838 stores the site information of the site B, the information terminal 104 does not perform the process from Steps S1315 to S1317.

At Step S1315, based on the access information to the site B included in the received beacon, the site information acquisition unit 832 of the information terminal 104 transmits, to the management server 106, the request for acquiring the site information of the site B.

At Step S1316, the site information provider 815 of the management server 106 accepting the request for acquiring the loculation information collects the site information on the site B. For example, the site information provider 815 collects data of the site B from the apparatus information 821 illustrated in FIGS. 10AA and 10AB and from the geographic information illustrated in FIGS. 11A to 11C.

At Step S1317, the site information provider 815 of the management server 106 transmits the collected data (apparatus information and geographic information) on the site B to the information terminal 104 requesting such information.

At Step S1318, the site information acquisition unit 832 of the information terminal 104 acquires the site information on the site B transmitted from the management server 106. The execution controller 835 acquires the library ID "LIB00B" of the site B from the acquired site information.

At Step S1319, the execution controller 835 of the information terminal 104 selects the company B library 512*b* illustrated in FIG. 5 (the processing executing unit 836*b* illustrated in FIG. 8) according to the library ID "LIB00B" of the site B acquired at Step S1318.

At Step S1320, the selected company B library 512*b* (the processing executing unit 836*b*) executes the registration of the position information, for example, as illustrated in FIG. 14.

Thus, the present embodiment enables the information terminal 104 (a terminal device) to acquire information from different type sound waves output from the positioning devices 101, to execute the predetermined processing.

Registration of Position Information

FIG. 14 is a flowchart illustrating one example of registration processing of position information according to Embodiment 1. This processing is one example of the predetermined processing performed by the processing executing unit 836.

At Step S1401, the sound wave demodulator 901 of the processing executing unit 836 demodulates the sound wave acquired by the sound wave acquisition unit 834 to acquire the position ID unique to the positioning device 101.

At Step S1402, the processing executing unit 836 determines whether the position ID of the positioning device 101 is acquired at Step S1401.

When the position ID has been acquired, operation of the processing executing unit 836 proceeds to Step S1403. When the position ID has not been acquired, the processing executing unit 836 proceeds to Step S1405.

At that time, through the selection of processing executing unit, for example, illustrated in FIGS. 12 to 13B, the information terminal 104 has selected the processing executing unit 836 capable of executing the predetermined processing in each site. Accordingly, if the position ID of the positioning device 101 is not acquired, for example, it is conceivable that the information terminal 104 is outside the output ranges 301-1 to 301-3 of sound wave from the positioning devices 101-1 to 101-3 on the floor A 110-1 illustrated in FIG. 3.

At S1403, the coordinate acquisition unit 902 of the processing executing unit 836 uses the position ID acquired by the sound wave demodulator 901 and the site information 840 acquired by the site information acquisition unit 832 to acquire the coordinate data of the position of the information terminal 104.

At S1404, the coordinate calculator 903 of the processing executing unit 836 initializes the information on travel (i.e., distance of travel) calculated and restarts calculation of travel information using the coordinate data acquired at Step S1403.

At Step S1405, the coordinate calculator 903 of the processing executing unit 836 calculates the direction of travel and distance of travel of the information terminal 104 using the sensor 608, such as an accelerometer or a geomagnetic sensor, and locates (calculates) a current position of the information terminal 104 by PDR.

At S1406, the position information transmitter 904 of the processing executing unit 836 transmits, to the management server 106, a request for registration of the coordinate data of the position of the information terminal 104 located at Step S1403 or Step S1405, the App ID, and positioning time.

As the processing executing unit 836 executes the above-described processing at predetermined intervals (e.g., 1-second intervals), the position information manager 816 of the management server 106 can manage the position information of the information terminal 104 at the predetermined intervals.

Embodiment 2

Embodiment 1 described above concerns the example in which the scheme of output of the sound wave including the position ID is different in each site. In Embodiment 2, a section (hereinafter "geofences") is set in the site, and the type of sound wave output inside the section differs from the type of sound wave output outside the section.

Example of Geofence

Figure 15:
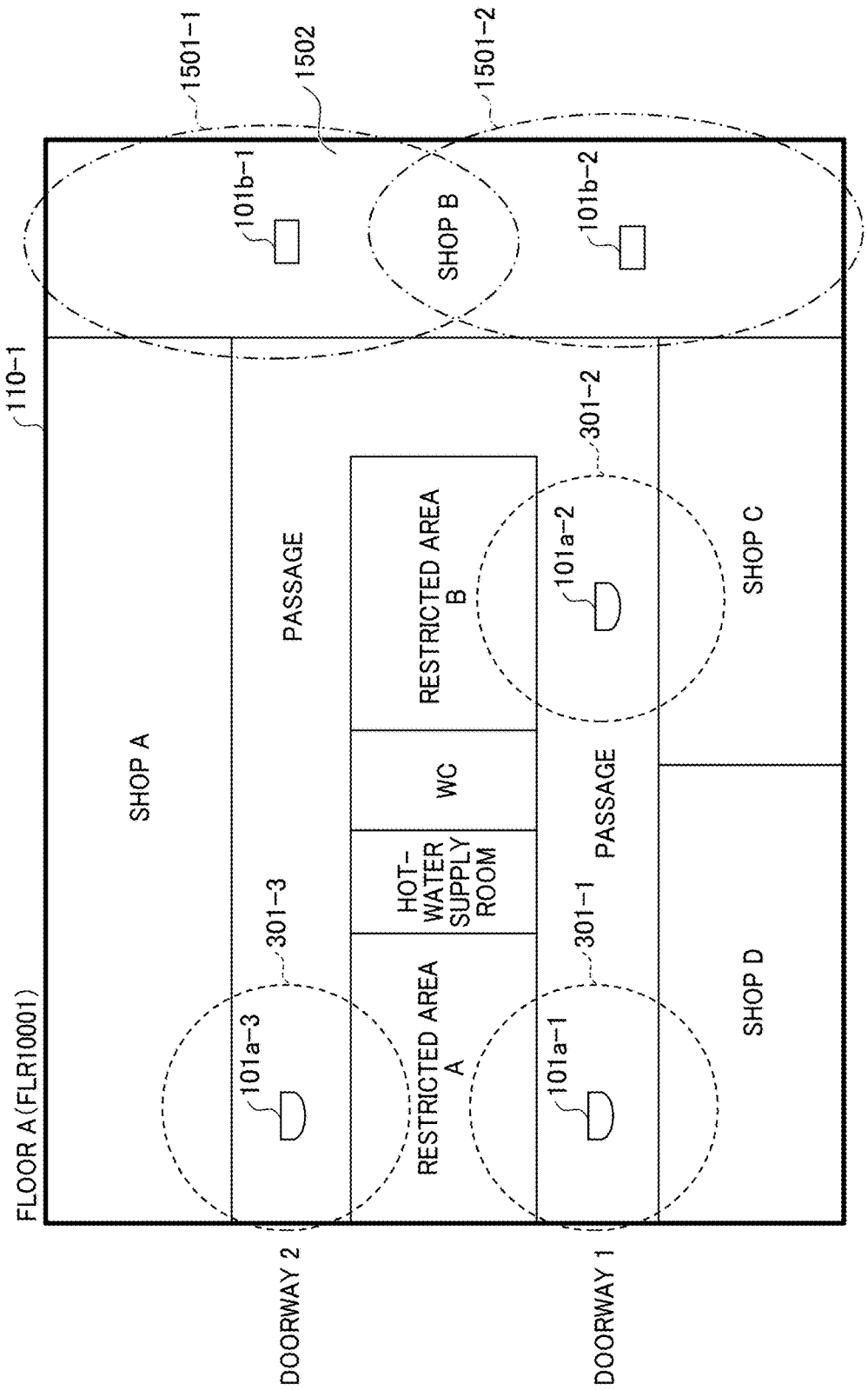
FIG. 15 is an illustration for explaining a geofence according to Embodiment 2.

FIG. 15 is an illustration for explaining a geofence according to Embodiment 2. The floor A 110-1 illustrated in FIG. 15 corresponds to the floor A 110-1 illustrated in FIG. 3 according to Embodiment 1, and positioning devices 101*b*-1 and 101*b*-2 are installed in the shop B.

For example, the positioning devices 101*a*-1 to 101*a*-3 output the company A sound waves. The positioning devices 101*b*-1 and 101*b*-2 output the company B sound waves including the position IDs, in output ranges 1501-1 and 1501-2, respectively.

Further, in the present embodiment, a geofence 1502 enclosing the area of the shop B is defined. As the information terminal 104 enters the geofence 1502, the information terminal 104 switches the processing executing unit 836 to the processing executing unit 836*b* that is the company B library. Further, as the information terminal 104 exits the geofence 1502, the information terminal 104 switches the processing executing unit 836 to the processing executing unit 836*a* that is the company A library.

With this configuration, in the present embodiment, even in the site including a plurality of sections different in sound wave type including the position ID, the information terminal 104 can select the processing executing unit 836 capable of executing the predetermined processing in such a section, thereby executing the predetermined processing.

Example of Geofence

FIG. 16 illustrates an example of geofence information according to Embodiment 2. The geographical information 822, managed by the geographical information management unit 813 of the management server 106 according to the present embodiment, includes geofence information 1601 illustrated in FIG. 16, for example. In the example illustrated in FIG. 16, the geofence information 1601 includes "Floor ID", "Section ID", "Section Type", "Library ID", "Library Type", and "Position of Section".

The floor ID is data for identifying the floor. The section ID is data for identifying, for example, the geofence 1502 described with reference to FIG. 15. The section type indicates the type of the geofence 1502.

The library ID is data identifying the processing executing unit 836 capable of executing the predetermined processing in the geofence 1502. The library type is data indicating the type of the processing executing unit 836 capable of executing the predetermined processing in the geofence 1502.

The position of section indicates the area of the geofence 1502, for example, defined with coordinates (latitude and longitude) of four corner points, namely, the upper left, the lower left, the upper right, and the lower right, of the geofence 1502. Alternatively, the position of section can be represented with the coordinates at the center of the geofence 1502 and the radius thereof.

The apparatus information management unit 812 and the geographical information management unit 813 according to the present embodiment are examples of the site information manager to manage the site information including the specifying information for specifying the processing executing unit 836 capable of executing the predetermined processing in each site where at least one positioning device 101 is placed. The geofence information 1601 is one example of the specifying information for specifying the processing executing unit 836 capable of executing the predetermined processing in each site.

Flow of Processing

Figure 17:
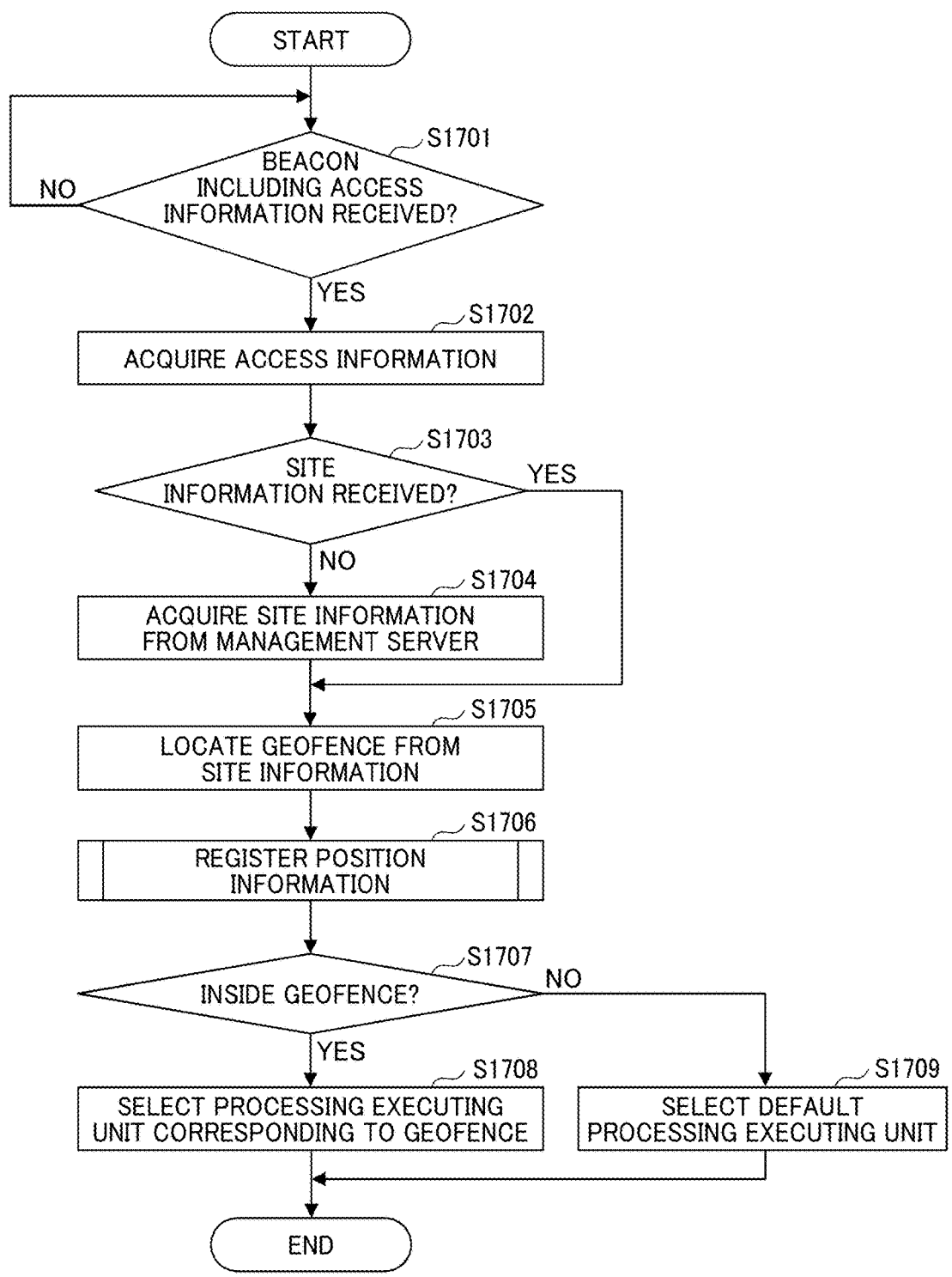
FIG. 17 is a flowchart of selection of processing executing unit according to Embodiment 2.

FIG. 17 is a flowchart illustrating an example of selection of processing executing unit according to Embodiment 2. The process from Steps S1701 to S1703 in FIG. 17 is the same as the selection performed from Steps S1201 to S1203 illustrated in FIG. 12 according to Embodiment 1, and redundant descriptions are omitted below.

At Step S1704, the site information acquisition unit 832 of the information terminal 104 uses the access information acquired at Step S1702 to acquire, from the management server 106, the site information 840 on the site corresponding to the position of the information terminal 104. The site information acquisition unit 832 stores the site information 840 in the storing unit 838. The site information 840 according to the present embodiment includes the geofence information 1601, for example, illustrated in FIG. 16.

At Step S1705, the execution controller 835 of the information terminal 104 acquires geofence information 1601 included in the site information 840 stored in the storing unit 838 and locates the geofence 1502.

For example, the execution controller 835 determines the coordinate range of the geofence 1502 with the coordinates of the four corner points at the upper left, the lower left, the upper right, and the lower right of the geofence 1502, stored as the position of section in the geofence information 1601 illustrated in FIG. 16.

At Step S1706, the information terminal 104 registers the position information as illustrated in FIG. 14. At that time, the processing executing units 836 performs, by default, initial registration of position information, using, e.g., the processing executing unit 836a. The subsequent registration of position information is performed by the processing executing unit 836 selected in Steps S1707 to S1709.

At Step S1707, the execution controller 835 of the information terminal 104 determines whether the information terminal 104 (located at Step S1706) is positioned inside the geofence 1502 located at Step S1705.

For example, the execution controller 835 compares the coordinates of the information terminal 104 determined (registered) at Step S1706 with the coordinate range of the geofence 1502 determined at Step S1705. When the coordinates of the information terminal 104 fall (or are within) in the coordinate range of the geofence 1502, the execution controller 835 determines that the information terminal 104 is within the geofence 1502. By contrast, when the coordinates of the information terminal 104 are not inside the coordinate range of the geofence 1502, the execution controller 835 determines that the information terminal 104 is outside the geofence 1502.

When the information terminal 104 is located inside the geofence 1502, the execution controller 835 proceeds to Step S1708. By contrast, when the information terminal 104 is not inside the geofence 1502, the execution controller 835 proceeds to Step S1709.

At S1708, the execution controller 835 of the information terminal 104 selects one of the processing executing units 836 (e.g., the processing executing unit 836b) corresponding to the geofence 1502. With this process, the subsequent registration of position information at Step S1706 is performed by the processing executing unit 836b corresponding to the geofence 1502.

At S1709, the execution controller 835 of the information terminal 104 selects the default processing executing unit 836 (e.g., the processing executing unit 836a). Then, at Step S1706, the processing executing unit 836a that is the default performs the subsequent registration of position information.

With the above-described process, according to the present embodiment, as the information terminal 104 enters the predetermined geofence 1502, the information terminal 104 automatically selects one of the processing executing units 836 capable of executing the predetermined processing in the geofence 1502. Similarly, as the information terminal 104 exits the predetermined geofence 1502, the information terminal 104 automatically selects the default processing executing unit 836 capable of executing the predetermined processing in that site.

Note that aspects of Embodiment 2 can be combined with aspects of Embodiment 1. For example, the information terminal 104 can automatically select the default processing executing unit 836 capable of executing the predetermined processing in the site According to Embodiment 1, and automatically select the processing executing units 836 capable of executing the predetermined processing in the geofence according to Embodiment 2.

Variations

Embodiments 1 and 2 are examples adopting aspects of this disclosure, and variations and modifications are possible.

For example, although, in Embodiments 1 and 2, the information terminal 104 acquires the beacon including the access information in short-range wireless communication from the positioning device 101 to acquire the site information from the management server 106, this is one example. The information terminal 104 can acquire the site information in a different manner.

In another example, the information terminal 104 is configured to acquire the site information from the management server 106 based on the access information transmitted from the wireless gateway 102 installed in the site or an access point on a wireless LAN.

In yet another example, the information terminal 104 is configured to locate the information terminal 104 itself with the positioning unit 839 different from the positioning library 504 and acquire, from the management server 106, the site information on the site corresponding to the position of the information terminal 104. The positioning unit 839 can acquire the position information on the information terminal 104 using, for example, the positioning signal received by the GPS receiver 609 or a geolocation service on the network 120.

Additionally, as described above, the functions of the management server 106 can be divided into a plurality of information processing apparatuses, which can be placed at different sites. For example, the first information processing apparatus to manage the site information and the second information processing apparatus to manage the position information can be either an identical information processing apparatus or different information processing apparatuses.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An information terminal comprising:
circuitry configured to:
acquire, using a plurality of function libraries, identification data unique to each of a plurality of positioning devices, the identification data being acquired from sound waves that are output, respectively, from the plurality of positioning devices, the plurality of function libraries configured to acquire the identification data in different schemes from each other;
acquire site information of a corresponding site being one of a plurality of sites in each of which at least one positioning device is placed, from an information processing apparatus that manages, for each site, the site information that includes specifying information for specifying one function library of the plurality of function libraries capable of executing predetermined processing on the corresponding site corresponding to a position of the information terminal; and
cause the function library specified by the specifying information to execute the predetermined processing.

2. The information terminal according to claim 1, wherein the site information includes:
the identification data identifying the at least one positioning device placed on each site; and
coordinate data indicating a location of the at least one positioning device.

3. The information terminal according to claim 2, wherein the predetermined processing includes:
identifying the coordinate data of the information terminal based on the identification data acquired from one of the sound waves and the site information; and
transmitting, to the information processing apparatus, terminal identification data for identifying the information terminal and position information including the coordinate data of the information terminal.

4. The information terminal according to claim 1, wherein the specifying information includes identification data for identifying the one function library of the plurality of function libraries capable of executing the predetermined processing on the corresponding site.

5. The information terminal according to claim 1, wherein the specifying information includes:
position information on a section on the corresponding site; and
information on the one function library of the plurality of function libraries capable of executing the predetermined processing in the section.

6. The information terminal according to claim 1, wherein the specifying information includes association information associating the identification data of the at least one positioning device placed on the site with identification data for identifying the one function library of the plurality of function libraries capable of executing the predetermined processing.

7. The information terminal according to claim 1, wherein the different schemes differ in at least one of demodulation, encryption, and frequency allocation.

8. The information terminal according to claim 1, wherein the circuitry is further configured to:

receive a radio wave including access information to acquire the site information; and
acquire the site information using the access information.

9. An information processing system comprising:
the information terminal according to claim 1;
the plurality of positioning devices each comprising circuitry configured to transmit a radio wave including access information for acquiring the site information; and
the information processing apparatus connected with the information terminal via a network and including circuitry configured to:
manage, for each site, site information that includes specifying information for specifying one function library of the plurality of function libraries capable of executing the predetermined processing on the site,
receive, from the information terminal, an acquisition request for the site information; and
transmit the site information to the information terminal in response to the acquisition request.

10. An information processing apparatus connected, via a network, with an information terminal that acquires, using a plurality of function libraries, identification data unique to each of a plurality of positioning devices, the identification data being acquired from sound waves that are output, respectively, from the plurality of positioning devices, the plurality of function libraries configured to acquire the identification data in different schemes from each other and execute predetermined processing, the information processing apparatus comprising:
circuitry configured to:
manage, for each site on which at least one positioning device is placed, site information that includes specifying information for specifying one of the plurality of function libraries capable of executing the predetermined processing on the site;
receive, from the information terminal, an acquisition request for the site information; and
transmit the site information to the information terminal in response to the acquisition request.

11. A method for operating an information terminal, the method comprising:
acquiring, using a plurality of function libraries, identification data unique to each of a plurality of positioning devices, the identification data being acquired from sound waves that are output, respectively, from the plurality of positioning devices, the plurality of function libraries configured to acquire the identification data in different schemes from each other and execute predetermined processing;
acquiring site information of a corresponding site being one of a plurality of sites in each of which at least one positioning device is placed, from an information processing apparatus that manages, for each site, the site information that includes specifying information for specifying one function library of the plurality of function libraries capable of executing the predetermined processing on the corresponding site corresponding to a position of the information terminal; and
causing the function library specified by the specifying information to execute the predetermined processing.

12. The method according to claim 11, wherein the site information includes:
the identification data identifying the at least one positioning device placed on each site; and coordinate data indicating a location of the at least one positioning device.

13. The method according to claim 12, wherein the predetermined processing includes:
    identifying the coordinate data of the information terminal based on the identification data acquired from one of the sound waves and the site information; and
    transmitting, to the information processing apparatus, terminal identification data for identifying the information terminal and position information including the coordinate data of the information terminal.

14. The method according to claim 11, wherein the specifying information includes identification data for identifying the one function library of the plurality of function libraries capable of executing the predetermined processing on the corresponding site.

15. The method according to claim 11, wherein the specifying information includes:
    position information on a section on the corresponding site; and
    information on the one function library of the plurality of function libraries capable of executing the predetermined processing in the section.

16. The method according to claim 11, wherein the specifying information includes association information associating the identification data of the at least one positioning device placed on the site with identification data for identifying the one function library of the plurality of function libraries capable of executing the predetermined processing.

17. The method according to claim 11, wherein the different schemes differ in at least one of demodulation, encryption, and frequency allocation.

18. The method according to claim 11, further comprising:
    receiving a radio wave including access information to acquire the site information; and
    acquiring the site information using the access information.

* * * * *